US012812372B2

(12) United States Patent
Alpert et al.

(10) Patent No.: US 12,812,372 B2
(45) Date of Patent: Nov. 24, 2026

(54) MULTI-PERIPHERAL CONNECTION SERVICE

(71) Applicant: TEXAS INSTRUMENTS INCORPORATED, Dallas, TX (US)

(72) Inventors: Yaron Alpert, Hod-Hasharon (IL); Guy Mishol, Shoham (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 121 days.

(21) Appl. No.: 18/642,304

(22) Filed: Apr. 22, 2024

(65) Prior Publication Data

US 2024/0430670 A1 Dec. 26, 2024

Related U.S. Application Data

(60) Provisional application No. 63/523,269, filed on Jun. 26, 2023.

(51) Int. Cl.

| | |
|---|---|
| ***H04L 29/00*** | (2006.01) |
| ***H04W 12/0431*** | (2021.01) |
| ***H04W 12/062*** | (2021.01) |

(52) U.S. Cl.

CPC ..... *H04W 12/0431* (2021.01); *H04W 12/062* (2021.01)

(58) Field of Classification Search

CPC ........................ H04W 12/0431; H04W 12/062

USPC .......................................................... 713/171

See application file for complete search history.

(56) References Cited

U.S. PATENT DOCUMENTS 9,495,326 B2 * 11/2016 Purkayastha ..... G06F 15/17306
2016/0366190 A1 * 12/2016 Xiao ................... H04L 65/1069
2021/0243599 A1 * 8/2021 Lee ........................... H04L 9/30

OTHER PUBLICATIONS

Bluetooth, "Bluetooth Core Specification," Version v5.4, Oct. 31, 2023, 3112 p., in two parts.
Bluetooth, "Bluetooth® Core Specification Version 5.4," Version 1.0.0m, Feb. 7, 2023, 43 p.
Farchy et al., "Simultaneous Multi-Frequency Multi-Peripheral BLE Service," U.S. Appl. No. 18/523,503, filed Dec. 4, 2023, 40 p.

* cited by examiner

*Primary Examiner* — Brandon Hoffman
*Assistant Examiner* — Michael D Anderson
(74) *Attorney, Agent, or Firm* — Michelle F. Murray; Charles Koch

(57) ABSTRACT

In an embodiment, a method includes: transmitting, by a first device, a first message during a first connection event; receiving, at the first device, a first response to the first message from a second device during the first connection event; receiving, by the first device, a second response to the first message from a third device during the first connection event; and receiving, by the first device, a third response from the second device during the first connection event.

25 Claims, 11 Drawing Sheets

MULTI-PERIPHERAL CONNECTION SERVICE

CROSS-REFERENCE TO RELATED APPLICATIONS

This application claims priority to U.S. Provisional Patent Application No. 63/523,269, filed Jun. 26, 2023, is titled "MULTI-PERIPHERALS CONNECTION SERVICE," and is hereby incorporated herein by reference.

This application is related to commonly assigned U.S. patent application Ser. No. 18/528,503, filed Dec. 4, 2023, is titled "SIMULTANEOUS MULTI-FREQUENCY MULTI-PERIPHERAL BLE SERVICE" and is hereby incorporated herein by reference.

TECHNICAL FIELD

The present disclosure relates generally to wireless communications, and, in particular embodiments, to a multi-peripheral connection service.

BACKGROUND

BLUETOOTH low energy (BLE) is a wireless communication technology useful for various applications and devices, such as in healthcare, fitness, security, home entertainment, and communication devices. The BLE communication technology provides for lower power consumption of the communication devices in comparison to BLUETOOTH or other wireless communication technologies, while also maintaining a similar wireless communication range and coverage. The reduced power consumption of the communication devices may be provided by a simpler modulation scheme in comparison to the other wireless communication technologies. The BLE communication technology is based on a BLE communication standard supported by various operating systems (OS), including ANDROID, IOS, WINDOWS, MACOS, LINUX, and other OS to operate the communication devices.

SUMMARY

Some embodiments relate to multi-device wireless communications.

In some embodiments, a first device (e.g., a central device) exchanges data with multiple other devices (e.g., peripheral devices) during a single connection event, referred herein as a multiple-peripheral connection (MPC) event. By exchanging data with multiple devices during the MPC event, some embodiments advantageously improve throughput (e.g., as there is no need to wait to subsequent connection events to exchange data with all the other devices).

In some embodiments, one or more of the other devices may transition into a sleep mode during the MPC event, and wake up during the same MPC event to exchange data with the first device. By entering sleep mode and then waking up during the same MPC event, some embodiments advantageously reduce power consumption without losing data throughput.

In some embodiments, packets exchanged between the first device and the multiple other devices during the MPC event may be performed using respective encryption keys. By using different encryption keys during the MPC event to exchange data, some embodiments advantageously maintain secure communication while the first device exchanges data with the multiple other devices.

In some embodiments, during the same MPC event, the first device may exchange data with a first other device, then a second other device, and then again with the first other device. By exchanging data with the same other devices in a non-consecutive manner during the same MPC event, some embodiments may advantageously reduce latency (e.g., during the first exchange, the first other device may request data, which may be generated and transmitted by the first device to the first other device during the second exchange while still servicing a second other device).

In some embodiments, all data exchanges during an MPC event may use the same communication channel. By using the same communication channel during all exchanges, some embodiments advantageously allow for other communications by other devices using other channels, and/or allow implementation of other advantageous features, such as the use of channel hopping for sequential MPC events.

In some embodiments, messages exchanged during an MPC event may be according to a BLE protocol. By transmitting messages according to the BLE protocol, some embodiments may be easier to implement, test, and support, and they may reuse, at least partially, existing hardware and software.

In some embodiments, a single advertisement packet may be used during an MPC event. By using a single advertisement packet, some embodiments advantageously allow for all peripherals to determine their respective associated allocated time, which may in turn advantageously allow for power reduction (as devices may transition to sleep mode) and/or efficient communication (e.g., as devices can plan actions based on an already determined timing during the MPC event.

In some embodiments, multiple advertisement packets may be used during an MPC event. By using multiple advertisement packets, some embodiments advantageously allow for flexible allocation of sub-connection events (e.g., based on needs of a particular other device or central device).

In some embodiments, the duration of sub-connection events of an MPC event may be different. By using sub-connection events of different duration, some embodiments advantageously allocate the transmission bandwidth efficiently among the other devices.

In some embodiments, the number of packets exchanged during sub-connection events of an MPC event may be different. By having different numbers of packets exchanged during different sub-connection events of an MPC, some embodiments advantageously efficiently exchange data, without transmitting empty packets (in case a device does not have more data to send and still has allocated number of packet slots) or having to wait until the next MPC to send additional data (e.g., in case a device has more data to send than the allocated number of packet slots).

In some embodiments, no advertisement packets may be transmitted during an MPC event. By avoiding transmission of advertisement packets, some embodiments advantageously can use such bandwidth for data transmission.

In some embodiments, the parameters associated with an MPC event may be dynamically renegotiated. By allowing for renegotiation of parameters, some embodiments may advantageously exhibit less overhead, and be more scalable, as the parameters of the MPC event are optimized and adapted for the current condition of the wireless network.

In some embodiments, the MPC capabilities of a device may be discoverable during an MPC event. By allowing for discoverability of the MPC capabilities of a device during the MPC event, selected MPC features may be implemented without jeopardizing losing communication with a particular device.

Some embodiments allow for subdividing the single connection event (MPC event) into multiple sub-connection events. In particular, each of these sub-connection events may have a flexible duration and may be allocated to a peripheral device. Within one sub-connection event, a peripheral device may exchange data with the central device. Since each of the multiple sub-connection events is respectively assigned to at least one peripheral device, multiple peripheral devices may exchange data with the central device and/or among each other within the single connection event. This may allow multi-peripheral data exchanges within the single connection event, since in each sub-connection event, data exchange is possible, which may advantageously increase the usage efficiency of the channel since there is no need to wait to subsequent connection events to exchange data with all the other devices. Thus, the throughput of the communication during at least a single connection event may be advantageously improved.

In accordance to an embodiment, a method includes: transmitting, by a first device, a first message during a first connection event; receiving, at the first device, a first response to the first message from a second device during the first connection event; receiving, by the first device, a second response to the first message from a third device during the first connection event; and receiving, by the first device, a third response from the second device during the first connection event, which, among other advantages, may advantageously improve throughput, e.g., by allowing multi-peripheral data exchanges.

In accordance to an embodiment, a method includes: receiving, at a first device, a first message from a second device during a first connection event; transmitting, by the first device, a second message during the first connection event; after transmitting the second message, entering a low power mode at the first device; exiting the low power mode at the first device; and after exiting the low power mode, transmitting, by the first device, a third message during the first connection event, which, among other advantages, may advantageously reduce power consumption, e.g., by allowing devices to transition to the low power mode without losing wireless connection.

In accordance to an embodiment, an electronic device includes: a transceiver; and a processor configured to: transmit, using the transceiver, a first advertisement packet during a first connection event, where the first advertisement packet indicates a first time for a second advertisement packet; receive, via the transceiver, a first response from a first device during the first connection event responsive to the first advertisement packet; transmit, using the transceiver, the second advertisement packet at the first time during the first connection event; and receive a second response during the first connection event responsive to the second advertisement packet, which, among other advantages, may advantageously improve throughput, e.g., by allowing multi-peripheral data exchanges.

In accordance to an embodiment, an electronic device includes: a transceiver; and a processor configured to: receive, using the transceiver, a first advertisement packet during a first connection event, where the first advertisement packet indicates a first time for a second advertisement packet; determine that the first advertisement packet is directed to a different device; responsive to the determination, transition into a sleep mode; wake up at the first time; receive, using the transceiver, the second advertisement packet; and transmit, using the transceiver, a response to the second advertisement packet, which, among other advantages, may advantageously reduce power consumption, e.g., by allowing devices to transition to the low power mode without losing wireless connection while advantageously improving throughput, e.g., by allowing multi-peripheral data exchanges.

In accordance to an embodiment, a method includes: transmitting, by a first device, a first broadcast message during a first connection event; transmitting, by the first device, a first message to a second device during the first connection event; receiving, at the first device, a first response to the first message from the second device during the first connection event; transmitting, by the first device, a second message to a third device during the first connection event; receiving, by the first device, a second response to the second message from the third device during the first connection event; transmitting, by the first device, a third message to the second device during the first connection event; and receiving, by the first device, a third response to the third message from the second device during the first connection event, which, among other advantages, may advantageously improve throughput, e.g., by allowing multi-peripheral data exchanges.

In accordance to an embodiment, a method includes: receiving, at a first device, a first message from a second device during a first connection event; transmitting, by the first device, a second message during the first connection event; after transmitting the second message, entering a low power mode at the first device; remaining in the low power mode as the second device serves a third device; exiting the low power mode at the first device during the first connection event; after exiting the low power mode, receiving, at the first device, a third message from the second device; and transmitting, by the first device, a fourth message, which, among other advantages, may advantageously reduce power consumption, e.g., by allowing devices to transition to the low power mode without losing wireless connection while advantageously improving throughput, e.g., by allowing multi-peripheral data exchanges.

In accordance to an embodiment, an electronic device includes: a transceiver; and a processor configured to: transmit, using the transceiver, a first advertisement packet during a first connection event, where the first advertisement packet indicates a first time for a second advertisement packet; receive, via the transceiver, a first response from a first device during a first sub-connection event of the first connection event responsive to the first advertisement packet; transmit, using the transceiver, the second advertisement packet at the first time during a second sub-connection event of the first connection event; and receive a second response during the first connection event responsive to the second advertisement packet, which, among other advantages, may advantageously improve throughput, e.g., by allowing multi-peripheral data exchanges.

This Summary is provided to introduce a selection of concepts in a simplified form that are further described below in the Detailed Description. Some embodiments may implement one or more (or all) of the features described in this Summary. Some features described in this section may not be implemented by some embodiments, while still exhibiting advantages over prior art. It may be understood that this Summary is not intended to identify key features or essential features of the claimed subject matter, nor is it intended to be used to limit the scope of the claimed subject matter.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
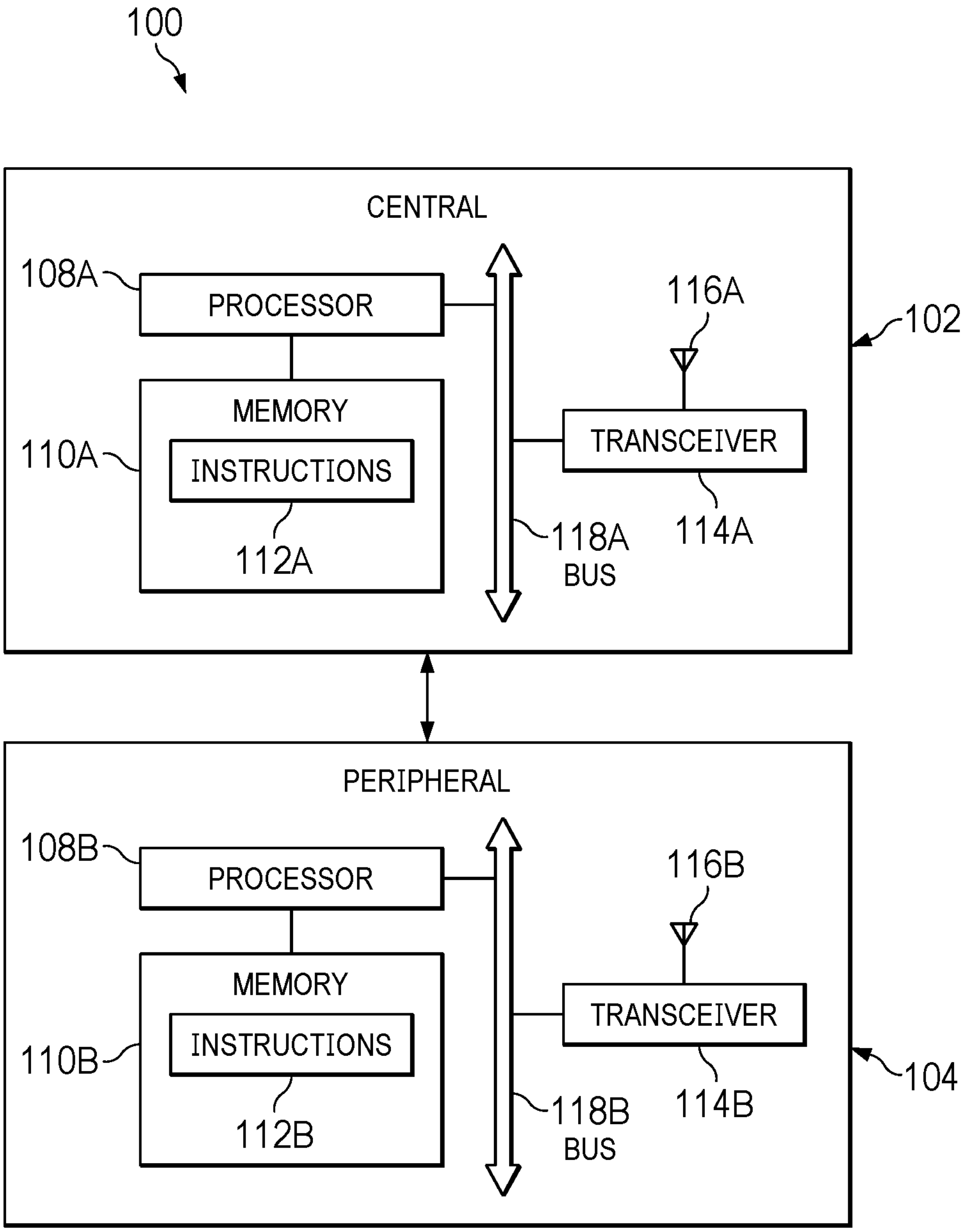
FIG. 1 is a block diagram of hardware architecture for a central device and a peripheral device in accordance with various examples.

The making and using of the embodiments disclosed are discussed in detail below. The present disclosure provides many applicable concepts that can be embodied in a wide variety of specific contexts. The specific examples discussed are merely illustrative of specific ways to make and use the embodiments, and do not limit the scope of the disclosure.

The description below illustrates the various specific details to provide an in-depth understanding of several example embodiments according to the description. The embodiments may be obtained without one or more of the specific details, or with other methods, components, materials and the like. In some cases, known structures, materials or operations are not shown or described in detail so as not to obscure the different aspects of the embodiments. References to “an embodiment” or “an example” in this description indicate that a particular configuration, structure or feature described in relation to the embodiment is included in at least one embodiment. Consequently, phrases such as “in one embodiment” or “in one example” that may appear at different points of the present description do not necessarily refer exactly to the same embodiment. Furthermore, specific formations, structures or features may be combined in any appropriate manner in one or more embodiments.

Embodiments of the present disclosure are described in specific contexts, e.g., a multi-peripheral connection service using BLE. Some embodiments may be used in other types of communication protocols, such as Bluetooth classic, as well as non-Bluetooth communication protocols, such as other wireless communication protocols different from Bluetooth.

According to the BLE communication standard, data transfers may be carried within connection events which are periodic and time synchronized between two communication devices. Connection events are characterized by a negotiated starting time, duration, and operating frequencies (e.g., a frequency set). The communication devices, which are also referred to as peer devices, may include a central device and a peripheral device.

The peripheral device may have more limited power available in comparison to the central device in some examples. For example, the peripheral device may be a sensor device or a wearable device, such as a temperature sensor or a wireless earphone, that has a smaller battery or a battery with a more limited power storage than the central device, which may be a smartphone, a tablet, or a laptop. In some examples, the peripheral device may be powered by energy harvesting.

Some central devices may be powered by battery. In some examples, the central device may, instead or in addition to the battery, have a power supply other than a battery, such as a gateway or a computer device plugged to a power outlet.

A time period of the connection event between the central and peripheral devices may range from a few milliseconds (e.g., 4 ms, 7.5 ms, 10 ms, etc.) to a few seconds (e.g., 4 s, 5 s, or more), depending on the network and device configurations, communication protocol, or applications. In some communication protocols, the connection events between the central and peripheral devices may have a different time period, such as lower than 4 ms (e.g., 1 ms or less) or higher than 4 s, such as 10 s, 60 s, or more).

For BLE connection events, the connection interval may be between 7.5 ms and 4 s. During a connection event, multiple data packets can be exchanged between the central and peripheral devices in either direction. The central device may transmit a first data packet to the peripheral device and receive a second data packet from the peripheral device.

In examples herein, connection events between a central device and multiple peripheral devices are described. With a multi-peripheral connection (MPC), a central device may serve more than one peripheral device at a single BLE connection event. In some embodiments, the MPC connection may occur at a single frequency (e.g., on a single channel) within a known frequency set. For example, in some embodiments, a device (central or peripheral) may advertise a feature set and its capabilities; recipients of the advertisement may send a request to join and/or negotiate service parameters; and peripheral devices may modify the service dynamically. A collection of service parameters may be referred to herein as a service pattern.

In some embodiments, channel hopping is used for sequential MPCs (e.g., according to a (e.g., predetermined) a hopping sequence).

In some embodiments, the MPC connection may use multiple frequencies, such as described in U.S. patent application Ser. No. 18/528,503.

In some embodiments, transmissions between devices may be secured using the examples herein. Some embodiments described herein may advantageously enable power savings and optimization, and may be more efficient with less overhead than other systems. The processes described herein may advantageously have lower delays compared to other advertising schemes.

Although the examples provided in the disclosure are described with reference to the BLE communication standard, the steps and systems in the examples can be extended to other wireless communication standards and technologies, such as BLUETOOTH, IEEE 802.15.4-based protocols such as Zigbee and Thread, ultrawide band (UWB), WI-FI, wireless local area network (WLAN), low-power wireless personal area network (WPAN), Narrowband Internet of Things (NB-IoT), Long Term Evolution Machine Type Communication (LTE-M), proprietary wireless communication protocols, and other suitable wireless communications technologies (which may or may not be standardized).

FIG. 1 is a block diagram 100 of hardware architecture for a central device and a peripheral device (e.g., an endpoint peripheral (EPP) device) in accordance with various examples herein. The components in FIG. 1 process and exchange data signals in various examples. The devices in FIG. 1 may be referred to herein as wireless devices or wireless electronic devices in some examples.

In some examples, the devices 102 and 104 in FIG. 1 may be transmitting or receiving devices capable of establishing a connection to transmit and receive data or other packets in accordance with a BLE communication standard. For example, each of the devices 102 and 104 may be a computer, mobile or Internet of Things (IoT) device, or other device capable of establishing a connection with a network, such as the Internet, or with another device for exchanging data packets. The hardware architecture includes hardware components that may be part of the processing and communication systems.

FIG. 1 illustrates a central device 102 (e.g., a central 102) and a peripheral device 104 (e.g., a peripheral 104). The devices 102 and 104 may be referred to as nodes in examples herein. As shown in FIG. 1, each of the devices (e.g., central 102 or peripheral 104) includes one or more processors 108 and one or more memories 110. The memories 110 may include instructions 112. In some examples, the devices may also include one or more transceivers 114 and one or more antennas 116 for establishing wireless connections. These components may be coupled through a bus 118, or in any other suitable manner. In FIG. 1, an example in which the components are coupled through a bus 118 is shown.

In FIG. 1, central device 102 includes processor 108A, memory 110A, instructions 112A, transceiver 114A, antenna 116A, and bus 118A. Peripheral device 104 includes processor 108B, memory 110B, instructions 112B, transceiver 114B, antenna 116B, and bus 118B.

A processor 108 (e.g., 108A or 108B) may be configured to read and execute computer-readable instructions. For example, the processor 108 may be configured to invoke and execute instructions stored in the memory 110, including the instructions 112. The processor 108 may support one or more global systems for wireless communication. Responsive to the processor 108 transmitting a message or data, the processor 108 drives or controls the transceiver 114 to perform the transmitting. The processor 108 also drives or controls the transceiver 114 to perform receiving, responsive to the processor 108 receiving a message or data. Therefore, the processor 108 may be considered as a control center for performing transmitting or receiving and the transceiver 114 is an executor for performing the transmitting and receiving operations.

In some examples, any or all of processors 108 may be implemented as a generic or custom processor or controller capable of executing instructions stored in a memory. In some examples, any or all of processors 108 may be implemented as an application-specific integrated circuit (ASIC). In some examples, any or all of processors 108 may include one or more of a field programmable gate array (FPGA), a central processor unit (CPU), a graphic processor unit (GPU), a digital signal processor (DSP). In some examples, any or all of processors 108 may include a finite state machine (FSM). Other implementations are also possible.

In some examples, the memory 110 may be coupled to the processor 108 through the bus 118 or an input/output port (not shown). In other examples, the memory 110 may be integrated with the processor 108. The memory 110 may be a non-transitory computer-readable medium configured to store various software programs and/or multiple groups of instructions, including instructions 112. For example, the memory 110 may include a high-speed random-access memory and/or may include a nonvolatile memory such as one or more disk storage devices, a flash memory or another nonvolatile solid-state storage device. The memory 110 may store an operating system such as ANDROID, IOS, WINDOWS, or LINUX. The memory 110 may further store a network communication program. The network communication program is useful for communication with one or more attached devices, one or more user equipment, or one or more network devices, for example. The memory 110 may further store a user interface program. The user interface program may display content of an application through a graphical interface and receive a control operation performed by a user on the application via an input control such as a menu, a dialog box, or a physical input device (not shown). The memory 110 may be configured to store the instructions 112 for implementing the various methods and processes provided in accordance with the various examples of this description. Memory 110 may be implemented in any suitable manner.

The antenna 116 may be configured to enable the exchanging of wireless communication signals between the processing system and a network or another system or device. The antenna 116 may be configured to convert electromagnetic energy into an electromagnetic wave in free space or convert an electromagnetic wave in free space into electromagnetic energy in a transmission line. The transceiver 114 may be configured to transmit a signal that is provided by the processor 108 or may be configured to receive a wireless communication signal received by the antenna 116. In this example, the transceiver 114 may be considered a wireless transceiver. Antenna 116 may be implemented in any suitable manner.

In some embodiments, processor 108, memory 110, and transceiver 114 may be implemented in a single integrated circuit (IC), such as inside a single package. In some embodiments, part or all of memory 110 and/or transceiver 114 may be implemented external to a package that includes processor 108.

In some embodiments, antenna 116 may be external to the device (e.g., 102 or 104), such as external to a package that includes components (e.g., 108, 110, and/or 116) of the device.

The hardware architectures of each of devices 102, 104, may also include another communication component such as a Global Positioning System (GPS) module, cellular module, a BLUETOOTH or BLE module, Zigbee module, or a WI-FI module. The hardware architecture may also support another wireless communication signal such as a satellite signal or a short-wave signal. The hardware architectures may also be provided with a wired network interface or a local area network (LAN) interface to support wired communication.

In various examples, the hardware architectures of devices 102, 104, may further include an input/output device (not shown) such as an audio input/output device, a key input device, a display and the like. The input/output device may be configured to implement interaction between the hardware architecture and a user/an external environment and may include the audio input/output device, the key input device, the display, and the like. The input/output device may further include a camera, a touchscreen, a sensor, and the like. The input/output device may communicate with the processor 108 through a user interface.

The hardware architectures shown in FIG. 1 are examples of implementation in various examples of this description. During actual application, the hardware architectures may include more or fewer components.

In examples herein, MPC connection events are described, where a central device 102 may serve more than one peripheral device 104 at a single BLE connection event. In some embodiments, the MPC connection may occur at a single frequency (e.g., single communication channel). Methodologies are described herein that enable a peripheral device 104 to join or leave a service. In some embodiments, peripheral devices 104 may also modify the service profile dynamically. In some embodiments, MPC services are advantageously secure, power-efficient, and scalable. In some embodiments, MPC services may advantageously have less overhead and lower delays compared to other processes. In some embodiments, MPC services may advantageously enable power savings and power optimization, both at the peripheral devices 104 and at the central device 102.

In examples herein, an MPC service provides for discovery, establishment, operation, and modification for a set of peripheral devices 104 that can be served at a single connection event. In some embodiments, a peripheral device 104 or a central device 102 can advertise MPC capabilities. In some embodiments, the central device 102 can advertise a potential or existing MPC service. In some embodiments, a peripheral device 104 can advertise capabilities and a request for a specific MPC service pattern.

In some embodiments, peripheral devices 104 may send requests to join an MPC service, which can include a specific service pattern. The peripheral device 104 may receive a response from a central device 102 that includes the relevant MPC service pattern, and the service patterns may be renegotiated.

In some embodiments, during the MPC service, peripheral devices 104 may send an MPC service pattern request, which may be confirmed by the central device 102 or renegotiated. In some embodiments, multiple peripheral devices 104 may be served during a single connection event. A single connection event may have two or more sub-connection events, and a peripheral device 104 may be served by the central device 102 during one or more sub-connection events of the connection event. One or more packets may be exchanged during any sub-connection event. In some examples herein, a sleep mode is described, where a peripheral device 104 may enter a low power mode (e.g., without wireless communication) for a portion of a connection event. In some embodiments, the MPC service may also handle encrypted communications between devices as described below.

The examples herein described a connection event that transmits packets using a single frequency. One example of a multi-peripheral, multi-frequency system is described in U.S. patent application Ser. No. 18/528,503.

Figure 2:
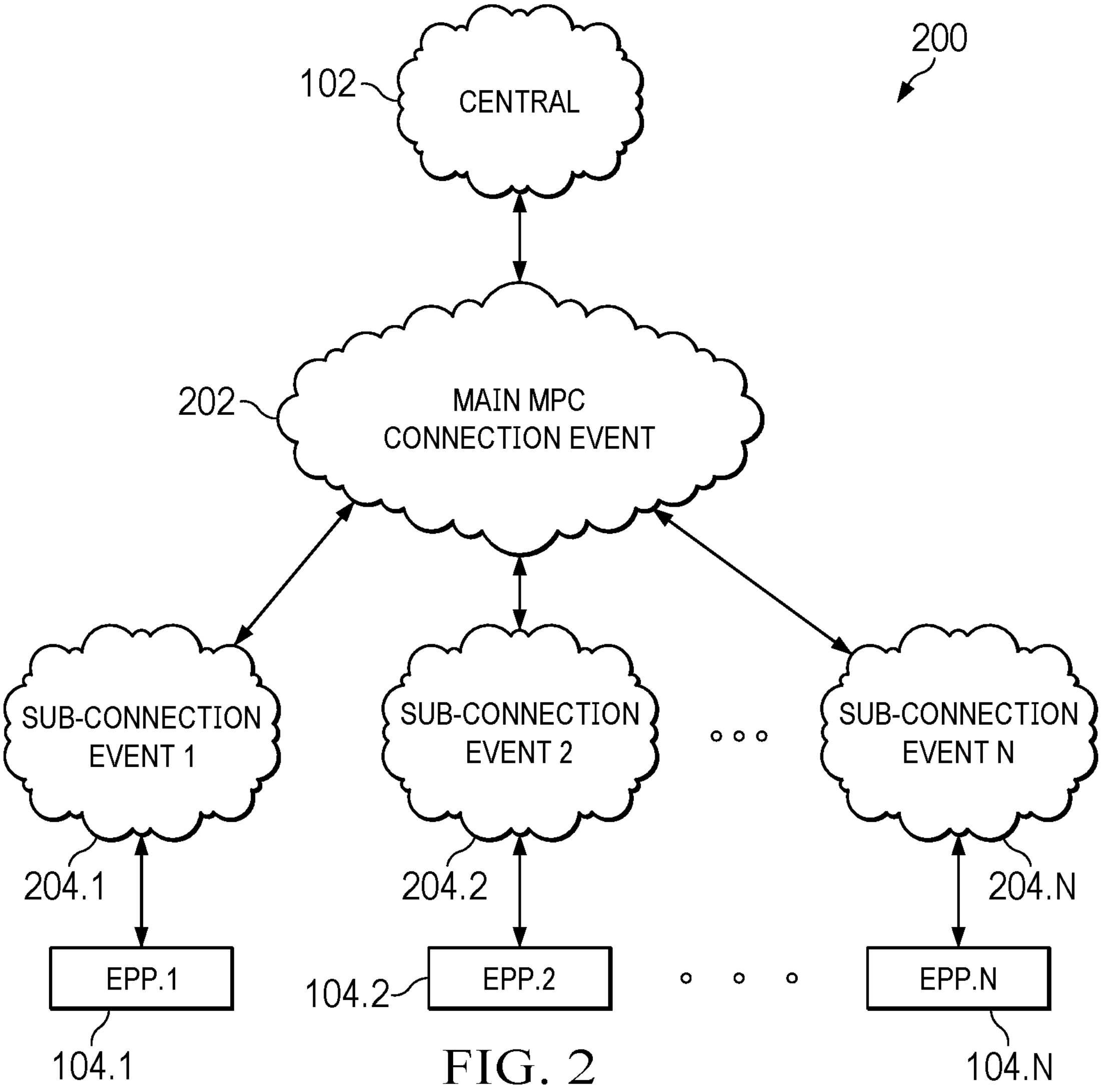
FIG. 2 is a diagram of a multi-peripheral connection (MPC) system in accordance with various examples.

FIG. 2 is a diagram of an MPC system 200 in accordance with various examples herein. MPC system 200 may be a BLE system in one example. System 200 includes a central device 102 and EPPs 104.1, 104.2, and 104.N (e.g., endpoint peripheral (EPP) devices 104). Communication between devices may be performed using main MPC connection event 202, and sub-connection events 204.1, 204.2 and 204.N (sub-connection events 204). Some components in system 200 are described above with respect to FIG. 1, and like numerals denote like components. In system 200, any number of peripheral devices 104 may be present, but EPPs 104.1, 104.2, and 104.N (where N is any number) are shown here for simplicity. Any number of sub-connection events 204 may be present, and sub-connection events 204.1, 204.2, and 204.N are shown here (where N may be any number).

System 200 includes a central device 102 that manages the MPC service in system 200. In some embodiments, central device 102 handles data exchange to other nodes in system 200, and sets anchor points for peripheral devices 104. In some embodiments, central device 102 manages the MPC connection events in system 200. Feature exchange and negotiation may occur between devices, and may include setting anchor points for MPC connection events and sub-connection events, setting connection event and sub-connection event duration and service pattern, etc. Anchor points indicate a time for an MPC connection event 202 or a sub-connection event 204 to begin and/or end in some examples.

Main MPC connection event 202 and sub-connection events 204.1 to 204.N may be used by system 200. In some embodiments, all communication exchanges during MPC connection event 202 and associated sub-connection events 204 occur in the same communication channel (e.g., at the same frequency).

The main MPC connection event 202 begins with a primary anchor point (PAP) and continues for a set amount of time. The central device 102 communicates with peripheral devices 104.1 to 104.N during the main MPC connection event 202 in a first communication channel (e.g., at a first frequency F0). The duration of a main MPC connection event 202 may be set by the central device 102. The sub-connection events 204 (e.g., 204.1 to 204.N) occur during the main MPC connection event 202. In some examples, the duration of the sub-connection events 204 are set by the central device 102. In some examples, each sub-connection event 204 begins with a virtual anchor point (VAP) that is set by central device 102.

In examples herein, any number of sub-connection events 204 may occur within a main MPC connection event 202. Also, a peripheral device 104 may communicate with the central device 102 during more than one sub-connection event 204 in a main MPC connection event 202. As an example, central device 102 and peripheral device 104.1 may communicate during sub-connection event 204.1. Central device 102 and peripheral device 104.2 may communicate during sub-connection event 204.2. Then, central device 102 and peripheral device 104.1 may communicate again during sub-connection event 204.3, where sub-connection events 204.1, 204.2, and 204.3 occur sequentially in time.

In some embodiments, the main MPC connection event 202 may have any number of sub-connection events 204, and the central device 102 may communicate with each peripheral device 104 during any number of times of sub-connection events 204 during the main MPC connection event 202. In some embodiments, all sub-connection events 204 during a main MPC connection event 202 occur sequential in time without a time overlap between each sub-connection event 204. In some embodiments, such as described in U.S. patent application Ser. No. 18/528,503, sub-connection events 204 may (e.g., partially) overlap in time as a different communication channel may be used for each sub-connection event 204 during a main MPC connection event 202.

In some embodiments, central device 102 may send advertisement packet(s) (e.g., an advertising message) that are received by multiple peripheral devices 104 during a main MPC connection event 202. In some embodiments, each peripheral device 104 receives a separate advertisement packet during its respective sub-connection event 204 of the main MPC connection event 202. In some embodiments, each peripheral device 104 may receive data packets from the central device 102, but each peripheral device 104 only responds to central device 102 if the data packet is directed to the particular peripheral device 104.

Figure 3:
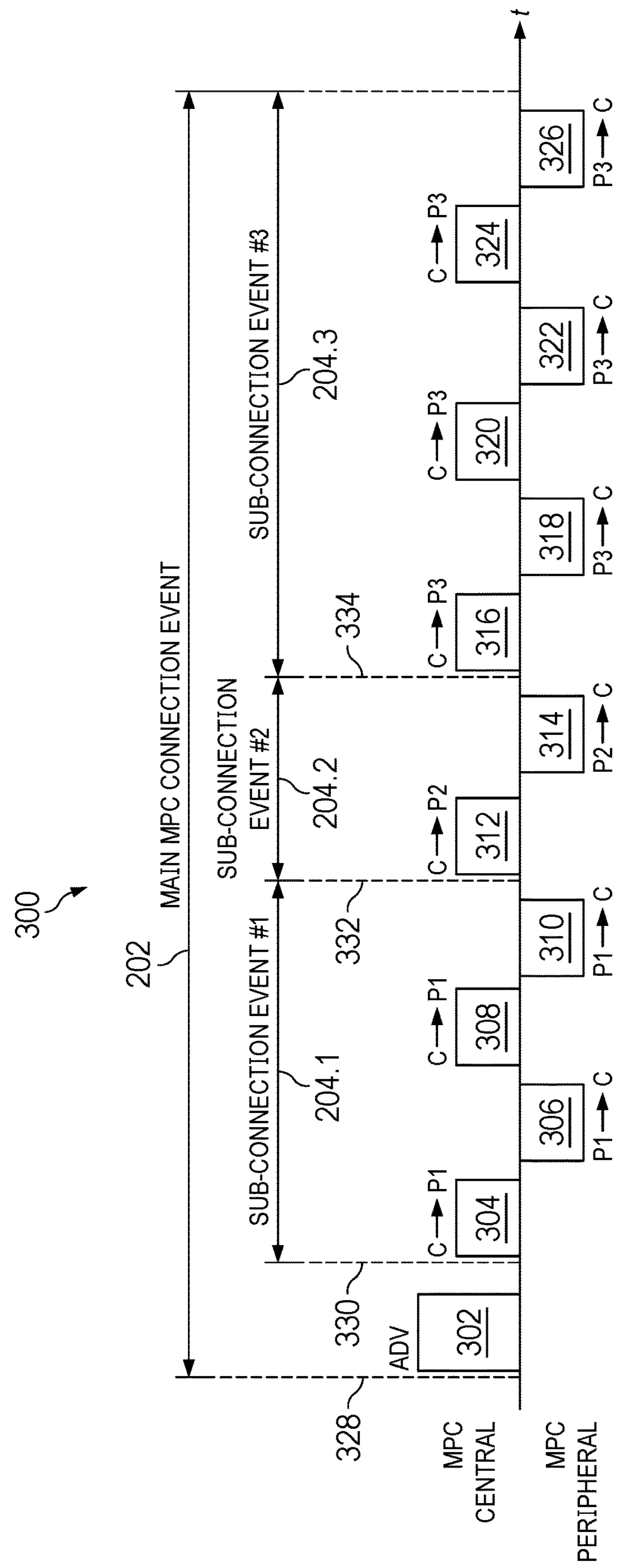
FIG. 3 is a timeline of an MPC connection event in accordance with various examples.

FIG. 3 is a timeline 300 of an MPC connection event in accordance with various examples herein. The MPC connection event may be a main MPC connection event 202 as described above. Timeline 300 includes a main MPC connection event 202, sub-connection event #1 204.1, sub-connection event #2 204.2, and sub-connection event #3 204.3. Timeline 300 also includes messages 302, 304, 306, 308, 310, 312, 314, 316, 318, 320, 322, 324, and 326. Timeline 300 also includes primary anchor point (PAP) 328 and virtual anchor points (VAP) 330, 332, and 334.

The main MPC connection event 202 begins at PAP 328. The sub-connection event #1 204.1 begins at VAP 330. The sub-connection event #2 204.2 begins at VAP 332. The sub-connection event #3 204.3 begins at VAP 334. In this example, the central device 102 communicates during the main MPC connection event 202 to each of the peripheral devices 104 using a first communication channel (e.g., using a first frequency F0).

In the messages shown in FIG. 3, the central device 102 is denoted with C, the peripheral device 104.1 is denoted with P1, the peripheral device 104.2 is denoted with P2, and the peripheral device 104.3 is denoted with P3.

As shown in FIG. 3, the main MPC connection event 202 begins at PAP 328 with device 102 sending message 302.

As shown in FIG. 3, in some embodiments, central device 102 initiates the main MPC connection event 202 at PAP 328 with transmission of an advertisement packet (ADV) 302.

The message 302 in this example is received by all peripheral devices 104 that share the main MPC connection event 202 (e.g., peripheral devices 104.1, 104.2, and 104.3 are listening to the communication channel in which message 302 is sent). Message 302 may be a broadcast message or a multicast message. Message 302 may be an advertisement packet that includes a proposed service pattern for the main MPC connection event 202. The service pattern may include a feature set for connection events, such as connection event duration, sub-connection event duration(s), anchor points (e.g., virtual anchor points for one or more of the sub-connection events of the MPC connection event 202), channel map (e.g., an indication of the communication channel to be used in subsequent MCP connection events 202, and/or an indication of the communication channels to be used during MPC connection event 202, in the case that multiple frequencies are used, such as described in U.S. patent application Ser. No. 18/528,503), transmission rates, bandwidth, packet size limitations, encryption information, and/or any other suitable features.

The recipients of message 302 (in this case, peripheral devices 104.1, 104.2, and 104.3) may confirm the service pattern or propose modifications. In some embodiments, negotiation may occur between the central device 102 and any of the peripheral devices 104. Such modifications may be effective during the same MPC connection event 202 and/or during a subsequent MPC communication event 202.

In some embodiments, message 302 includes an indication of the timing of VAP 330, 332, and 334. In some embodiments, such as in embodiments in which the timing of one or more of VAP 330, 332, and 334 has already been determined, and shared with peripheral devices 104.1, 104.2, and 104.2), such indication may be omitted from message 302.

In an example, a device (e.g., a responding device) that receives an advertisement may send an MPC join indication to the advertising device. The join indication may be a join accept or a join reject. The join accept response is a request to join the network using the advertised service pattern. The join reject response is an indication for negotiation of the service pattern, and may include a service pattern that is acceptable to the responding device, or proposed features for the connection event. Therefore, some embodiments described herein advantageously provide MPC service discovery, MPC service establishment, MPC service operation, and/or MPC service modification.

In this example, central device 102 communicates with peripheral device 104.1 during sub-connection event #1 204.1. Sub-connection event #1 204.1 begins at VAP 330. Central device 102 sends message 304 to peripheral device 104.1. Peripheral device 104.1 responds by sending message 306 to central device 102. Central device 102 sends message 308 to peripheral device 104.1. Peripheral device 104.1 responds by sending message 310 to central device 102.

In this example, four messages (304, 306, 308, and 310) are exchanged between central device 102 and peripheral device 104.1 during sub-connection event #1 204.1. However, any number of messages may be transmitted in other examples during sub-connection event #1 204.1 (e.g., by either central device 102 or peripheral device 104.1).

Sub-connection event #1 204.1 may be any (e.g., predetermined) duration (e.g., as determined/indicated in message 302 or as otherwise known to device 104.1). Central device 102 and peripheral device 104.1 may exchange messages using a service pattern advertised by either central device 102 or peripheral device 104.1. Central device 102 and peripheral device 104.1 may also negotiate or renegotiate a service pattern with any messages transmitted between them.

During sub-connection event #2 204.2, central device 102 communicates with peripheral device 104.2. Sub-connection event #2 204.2 begins at VAP 332. Central device 102 sends message 312 to peripheral device 104.2. Peripheral device 104.2 responds by sending message 314 to central device 102. In this example, two messages (312 and 314) are exchanged between central device 102 and peripheral device 104.2 during sub-connection event #2 204.2, but any number of messages may be transmitted in other examples during sub-connection event #2 204.2 (e.g., by either central device 102 or peripheral device 104.2).

Sub-connection event #2 204.2 may be any duration, and central device 102 and peripheral device 104.2 may exchange messages using any service pattern.

During sub-connection event #3 204.3, central device 102 communicates with peripheral device 104.3. Sub-connection event #3 204.3 begins at VAP 334. Central device 102 sends message 316 to peripheral device 104.3. Peripheral device 104.3 responds by sending message 318 to central device 102. Central device 102 sends message 320 to peripheral device 104.3. Peripheral device 104.3 responds by sending message 322 to central device 102. Central device 102 then sends message 324 to peripheral device 104.3. Peripheral device 104.3 responds by sending message 326 to central device 102. In this example, six messages (316, 318, 320, 322, 324 and 326) are exchanged between central device 102 and peripheral device 104.3 during sub-connection event #3 204.3, but any number of messages may be transmitted in other examples during sub-connection event #3 204.3 (e.g., by either central device 102 or peripheral device 104.3).

Sub-connection event #3 204.3 may be any duration, and central device 102 and peripheral device 104.3 may exchange messages using any service pattern.

Timeline 300 provides an example of an MPC connection event. The main MPC connection event 202 is sub-divided into any number of sub-connection events 204. In some embodiments, the number of sub-connection events 204 during an MPC connection event 202 may be equal to the number of peripheral devices exchanging data during the MPC connection event 202. In some embodiments, the number of sub-connection events 204 during an MPC connection event 202 may be higher than the number of peripheral devices exchanging data during the MPC connection event 202.

Three sub-connection events 204 are shown in FIG. 3, but any number of sub-connection events 204 may be present in other examples. Also, any number of messages may be transmitted during any sub-connection event 204. In some examples, central device 102 may communicate with a peripheral device 104 during multiple sub-connection events 204 of a given main MPC connection event 202. For example, central device may communication with peripheral device 104.1 during sub-connection event #1 204.1 and during sub-connection event #3 204.3.

In some embodiments, central device 102 may use the same service pattern for each sub-connection event 204. For example, in some embodiments, the duration of each of the sub-connection events 204 within an MPC connection event 202 is the same.

In some embodiments, central device 102 may use different service patterns for different sub-connection events 204. For example, in some embodiments, the duration of each of the sub-connection events 204 within an MPC connection event 202 may be different.

In some embodiments, messages transmitted between central device 102 and peripheral devices 104 may be encrypted (e.g., using symmetric or asymmetric encryption) in some examples. For example, in some embodiments, each peripheral device 104 may have an associated (e.g., symmetric or asymmetric) encryption key, such as peripheral device 104.1 having a first encryption key, peripheral device 104.2 having a second encryption key, and peripheral device 104.3 having a third encryption key. Messages sent from central device 102 to peripheral device 104.1 may be encrypted with the first encryption key. Messages sent from central device 102 to peripheral device 104.2 may be encrypted with the second encryption key. Messages sent from central device 102 to peripheral device 104.1 may be encrypted with the third encryption key. In embodiments in which each peripheral device 104 has a separate encryption key, messages from one peripheral device 104 will be unreadable by any device other than a device that has the encryption key, such as central device 102. Similarly, messages sent by central device 102 to a particular device 104 and encrypted for such particular device 104 may be unreadable to any other device 104. Therefore, messages from/to one peripheral device 104 may advantageously remain secure even if those messages are received by another peripheral device 104 in the same system.

In some embodiments, one or more peripheral devices 104 may send an advertisement packet to a central device 102 to advertise their capabilities and request service.

Figure 4:
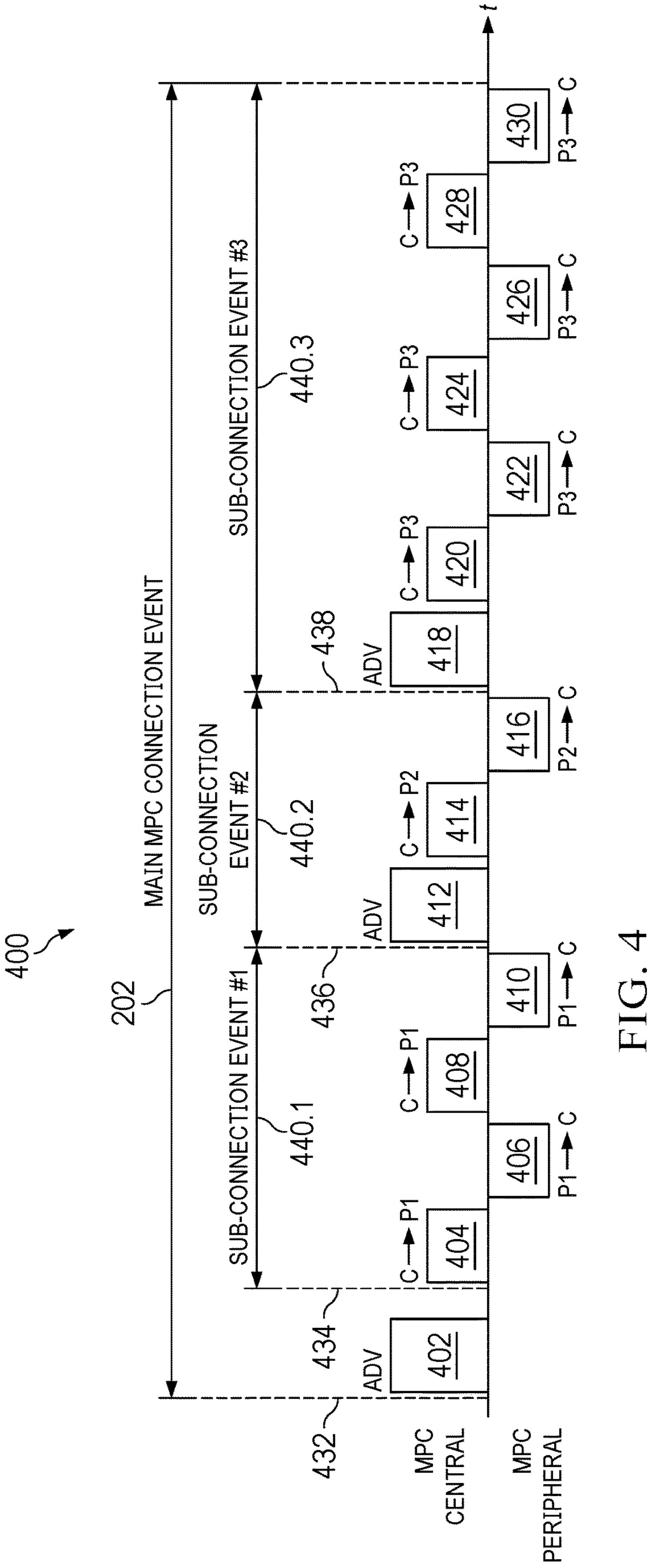
FIG. 4 is timeline of an MPC connection event in accordance with various examples.

FIG. 4 is a timeline 400 of an MPC connection event in accordance with various examples herein. The MPC connection event may be a main MPC connection event 202 as described above. Timeline 400 includes a main MPC connection event 202, sub-connection event #1 440.1, sub-connection event #2 440.2, and sub-connection event #3 440.3. Timeline 400 also includes messages 402, 404, 406, 408, 410, 412, 414, 416, 418, 420, 422, 424, 426, 428, and 430. Timeline 400 also includes primary anchor point (PAP) 432 and virtual anchor points (VAP) 434, 436, and 438.

Timeline 400 illustrates an embodiment that operates in a similar manner to the embodiment illustrated by timeline 300. In the embodiment illustrated by timeline 400, however, central device 102 transmits multiple advertisement packets (e.g., 402, 412, 418) during the same MPC connection event 202, as opposed to a single advertisement packet (e.g., 302) transmitted by central device 102 in the embodiment illustrated by timeline 300.

The main MPC connection event 202 begins at PAP 432. The sub-connection event #1 440.1 begins at VAP 434. The sub-connection event #2 440.2 begins at VAP 436. The sub-connection event #3 440.3 begins at VAP 438. In this example, the central device 102 communicates during the main MPC connection event 202 to each of the peripheral devices 104 using a first communication channel (e.g., using a first frequency F0).

In the messages shown in FIG. 4, the central device 102 is denoted with C, the peripheral device 104.1 is denoted with P1, the peripheral device 104.2 is denoted with P2, and the peripheral device 104.3 is denoted with P3. In this example, the main MPC connection event 202 begins at PAP 432. The central device 102 sends a message 402 that is an advertisement packet (ADV) in this example. The message 402 in this example is received by all peripheral devices 104 that share the main MPC connection event 202 (e.g., peripheral devices 104.1, 104.2, and 104.3). Message 402 may be a broadcast message or a multicast message. Message 402 may be an advertisement packet that includes a proposed service pattern for the main MPC connection event 202. The service pattern may include a feature set for connection events, such as connection event duration, sub-connection event duration(s), anchor points, frequencies, channel map, transmission rates, bandwidth, packet size limitations, encryption information, and any other suitable features. The recipients of message 402 (in this case, peripheral devices 104.1, 104.2, and 104.3) may confirm the service pattern or propose modifications. Negotiation may occur between the central device 102 and any of the peripheral devices 104.

Message 402, in some examples, may indicate to the peripheral devices 104 the duration and starting point for one or more (or all) of the sub-connection events 440 (e.g., the VAPs) and/or which device is to be addressed in one or more of such sub-connection events 440. For example, in an embodiment, message 402 provides an indication of the starting point of sub-connection event #2 440.2 (e.g., VAP 436) and an indication that sub-connection event 440.1 is allocated to device 104.1. Responsive to receiving message 402, peripheral devices 104.2 and 104.3 may enter or transition to a sleep mode (e.g., a low power mode) until sub-connection event #2 440.2 begins. Peripheral devices 104.2 and 104.3 may be in the sleep mode during sub-connection event #1 440.1, while central device 102 communicates with peripheral device 104.1. As such, some embodiments may advantageously reduce power consumption compared to other solutions.

In some embodiments, message 402 includes an indication of the timing of all other advertisement packets (e.g., 412, 418) to be transmitted. In some embodiments, message 402 includes an indication of the timing of the next advertisement packet but not the others. For example, in some embodiments, message 402 includes an indication of the timing of message 412 but not 418, and message 412 includes an indication of the timing of message 418.

In some embodiments, each peripheral device 104 is allocated only one sub-connection event 440 during an MPC connection event 202. In some such embodiments, each peripheral device 104 may be awake during the sub-connection event allocated to such peripheral device 104, and may enter into sleep mode at the end of such sub-connection event 440 and for the reminder of the MPC connection event 202. For example, peripheral device 104.1 may enter into sleep mode after sub-connection event #1 440.1 ends until the end of MPC connection event 202 (and may not wake up to receive subsequent advertisement packets during the reminder of such MPC connection event 202).

In some embodiments, a peripheral device 104 may be allocated more than one sub-connection event 440 during an MPC connection event 202. In some such embodiments, each peripheral may wake up to receive the advertisement packets (e.g., 412, 418), and may return to sleep mode if such advertisement packet indicates that the associated sub-connection event is not allocated to such peripheral device 104.

In some embodiments, the initial advertisement packet of an MPC connection event 202 (e.g., message 402) includes an indication of the timing of all other advertisement packets (e.g., 412, 418) to be transmitted during a particular MPC connection event 202 but only includes an indication of the device (e.g., 104.1) allocation of the associated sub-connection event, with subsequent messages (e.g., 412, 418) indicating the device being allocated to the respective sub-connection event (e.g., 104.2, and 104.3, respectively).

As described herein, any peripheral devices 104 may enter into or exit from sleep modes responsive to receiving information from central device 102 indicating the timing of the sub-connection events 440 corresponding to the peripheral devices 104 (e.g., in the advertisement packet following the virtual anchor points).

In this example, message 402 may be received by peripheral devices 104.2 and 104.3, and those devices may enter into a sleep mode until their respective sub-connection events 440 begin. Here, peripheral devices 104.2 and 104.3 may enter into a sleep mode during sub-connection #1 440.1. During sub-connection #1 440.1, central device 102 sends message 404 to peripheral device 104.1. Peripheral device 104.1 sends message 406 to central device 102. Central device 102 sends message 408 to peripheral device 104.1. Peripheral device 104.1 sends message 410 to central device 102.

In this example, four messages (404, 406, 408, and 410) are exchanged between central device 102 and peripheral device 104.1 during sub-connection event #1 440.1. However, any number of messages may be transmitted in other examples during sub-connection event #1 440.1. Sub-connection event #1 440.1 may be any duration. Central device 102 and peripheral device 104.1 may exchange messages using a service pattern advertised by either central device 102 or peripheral device 104.1. Central device 102 and peripheral device 104.1 may also negotiate or renegotiate a service pattern with any messages transmitted between them.

At VAP 436, sub-connection event #2 440.2 begins. During sub-connection event #2 440.2, central device 102 communicates with peripheral device 104.2. Peripheral device 104.1 may enter into a sleep mode at the conclusion of sub-connection event #1 440.1. Peripheral device 104.1 may remain in the sleep mode until its next sub-connection event 440 begins, which may be during main MPC connection event 202 or during another MPC connection event. Also, peripheral device 104.3 may be in a sleep mode during sub-connection #2 440.2.

During sub-connection event #2 440.2, peripheral device 104.2 receives message 412. The message 412 in this example may be received by all peripheral devices 104 that share the main MPC connection event 202 (e.g., peripheral devices 104.1, 104.2, and 104.3), if those devices are awake and receiving messages. Message 412 may be a broadcast message or a multicast message. Message 412 may be an advertisement packet that includes a proposed service pattern for the sub-connection event #2 440.2. Central device 102 and peripheral device 104.2 may exchange messages using a service pattern advertised by either central device 102 or peripheral device 104.2. Central device 102 and peripheral device 104.2 may also negotiate or renegotiate a service pattern with any messages transmitted between them.

During sub-connection #2 440.2, central device 102 sends message 414 to peripheral device 104.2. Peripheral device 104.2 sends message 416 to central device 102. In this example, three messages (412, 414, and 416) are exchanged between central device 102 and peripheral device 104.2 during sub-connection event #2 440.2. However, any number of messages may be transmitted in other examples during sub-connection event #2 440.2. Sub-connection event #2 440.2 may be any duration.

At VAP 438, sub-connection event #3 440.3 begins. During sub-connection event #3 440.3, central device 102 communicates with peripheral device 104.3. Peripheral device 104.2 may enter into a sleep mode at the conclusion of sub-connection event #2 440.2. Peripheral device 104.2 may remain in the sleep mode until its next sub-connection event 440 begins, which may be during main MPC connection event 202 or during another MPC connection event. Also, peripheral device 104.1 may be in a sleep mode during sub-connection #3 440.3.

Peripheral device 104.3 exits the sleep mode at or before VAP 438, in preparation to communicate with central device 102 during sub-connection #3 440.3. During sub-connection event #3 440.3, peripheral device 104.3 receives message 418. Message 418 in this example may be received by all peripheral devices 104 that share the main MPC connection event 202 (e.g., peripheral devices 104.1, 104.2, and 104.3), if those devices are awake and receiving messages. Message 418 may be a broadcast message or a multicast message. Message 418 may be an advertisement packet that includes a proposed service pattern for the sub-connection event #3 440.3. Central device 102 and peripheral device 104.3 may exchange messages using a service pattern advertised by either central device 102 or peripheral device 104.3. Central device 102 and peripheral device 104.3 may also negotiate or renegotiate a service pattern with any messages transmitted between them.

During sub-connection #3 440.3, central device 102 sends message 420 to peripheral device 104.3. Peripheral device 104.3 sends message 422 to central device 102. Central device 102 sends message 424 to peripheral device 104.3. Peripheral device 104.3 sends message 426 to central device 102. Central device 102 sends message 428 to peripheral device 104.3. Peripheral device 104.3 sends message 430 to central device 102.

In this example, seven messages (418, 420, 422, 424, 426, 428, and 430) are exchanged between central device 102 and peripheral device 104.3 during sub-connection event #3 440.3. However, any number of messages may be transmitted in other examples during sub-connection event #3 440.3. Sub-connection event #3 440.3 may be any duration.

In this example, the advertising messages (messages 402, 412, and 418) may be different from one another. The peripheral devices 104 may enter into sleep modes at certain times to reduce power consumption. The peripheral devices 104 may exit their respective sleep modes (e.g., wake up) at set times (e.g., a first time, a second time, etc.) to communicate during certain sub-connection events 440. Peripheral devices 104 may also enter or leave a service and rejoin at later times, which can reduce power consumption. Data may be exchanged with multiple peripheral devices 104 during a MPC connection event, rather than waiting for a later MPC connection event. Service patterns and features may be negotiated between devices.

Figure 5:
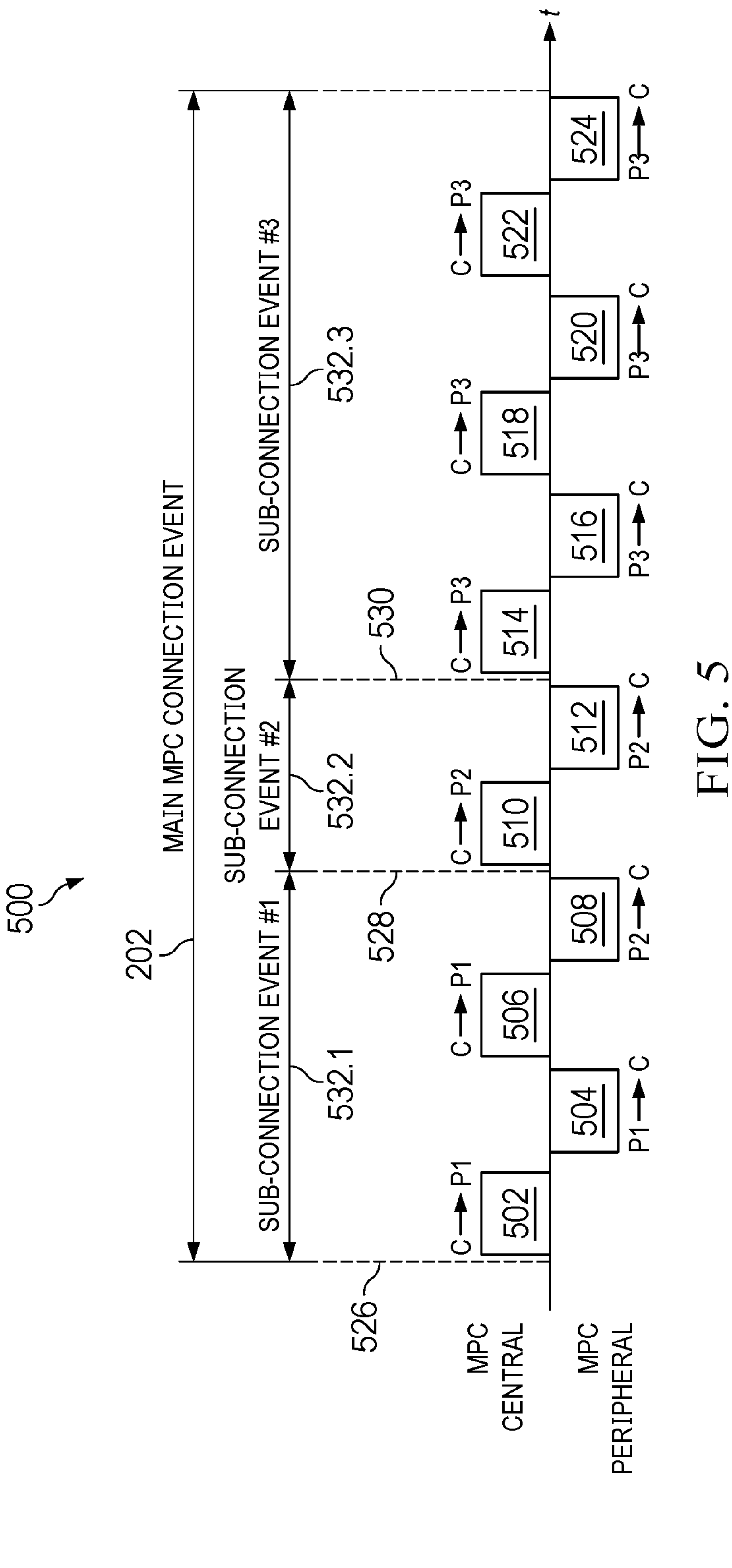
FIG. 5 is timeline of an MPC connection event in accordance with various examples.

FIG. 5 is a timeline 500 of an MPC connection event in accordance with various examples herein. The MPC connection event may be a main MPC connection event 202 as described above. Timeline 500 includes a main MPC connection event 202, sub-connection event #1 532.1, sub-connection event #2 532.2, and sub-connection event #3 532.3. Timeline 500 also includes messages 502, 504, 506, 508, 510, 512, 514, 516, 518, 520, 522, and 524. Timeline 500 also includes primary anchor point (PAP) 526 and virtual anchor points (VAP) 528 and 530.

Timeline 500 illustrates an embodiment that operates in a similar manner to the embodiment illustrated by timeline 300. In the embodiment illustrated by timeline 500, however, central device 102 does not transmit advertisement packets during the MPC connection event 202, as opposed to a single advertisement packet (e.g., 302) transmitted by central device 102 in the embodiment illustrated by timeline 300. As such, in embodiments such as illustrated in FIG. 5, peripheral devices 104 (e.g., 104.1, 104.2, and 104.3) use an auto-discovery methodology to determine when the sub-connection event allocated to such device 104 begins (e.g., by each device 104 determining whether a packet is for such device 104, e.g., based on a device identifier or the ability to decrypt the message).

As shown in FIG. 5, no advertising messages are shown in timeline 500. In some embodiments, service patterns are negotiated before the start of main MPC connection event 202 in this example. The main MPC connection event 202 begins at PAP 526. The sub-connection event #1 532.1 begins at PAP 526. The sub-connection event #2 532.2 begins at VAP 528. The sub-connection event #3 532.3 begins at VAP 530. In this example, the central device 102 communicates during the main MPC connection event 202 to each of the peripheral devices 104 using a first communication channel (e.g., using a first frequency F0).

In the messages shown in FIG. 5, the central device 102 is denoted with C, the peripheral device 104.1 is denoted with P1, the peripheral device 104.2 is denoted with P2, and the peripheral device 104.3 is denoted with P3. At PAP 526, sub-connection event #1 532.1 begins. During sub-connection #1 532.1, central device 102 sends message 502 to peripheral device 104.1. Peripheral device 104.1 sends message 504 to central device 102. Central device 102 sends message 506 to peripheral device 104.1. Peripheral device 104.1 sends message 508 to central device 102.

In this example, other peripheral devices 104 may be awake during sub-connection event #1 532.1 and receive messages 502 and 506 from central device 102. Peripheral devices 104.2 and 104.3 may receive messages 502 and 506. Peripheral devices 104.2 and 104.3 may only respond to central device 102 if messages 502 and 506 are directed towards them. A peripheral device 104 may determine if a message is directed to it by reading a device identifier in the message, where the device identifier identifies the device that the message is directed towards.

In some examples, messages from central device 102 may be encrypted with a key assigned to a specific peripheral device 104. In some such embodiments, peripheral devices 104 may ignore or discard any messages that they cannot decrypt and responds to messages that can be successfully decrypted (e.g., as opposed to using an explicit device identifier to determine whether to response to a message).

In this example, four messages (502, 504, 506, and 508) are exchanged between central device 102 and peripheral device 104.1 during sub-connection event #1 532.1. However, any number of messages may be transmitted in other examples during sub-connection event #1 532.1. Sub-connection event #1 532.1 may be any duration.

At VAP 528, sub-connection event #2 532.2 begins. During sub-connection #2 532.2, central device 102 sends message 510 to peripheral device 104.2. Peripheral device 104.2 sends message 512 to central device 102. Similar to sub-connection event #1 532.1, peripheral devices 104.1 and 104.3 may receive message 510, but may ignore or discard it because message 510 is directed towards another peripheral device (e.g., peripheral device 104.1). Two messages (510 and 512) are exchanged between central device 102 and peripheral device 104.2 during sub-connection event #2 532.2. Any number of messages may be transmitted in other examples during sub-connection event #2 532.2, and sub-connection event #2 532.2 may be any duration.

At VAP 530, sub-connection event #3 532.3 begins. During sub-connection #3 532.3, central device 102 sends message 514 to peripheral device 104.3. Peripheral device 104.3 sends message 516 to central device 102. Central device 102 sends message 518 to peripheral device 104.3. Peripheral device 104.3 sends message 520 to central device 102. Central device 102 sends message 522 to peripheral device 104.3. Peripheral device 104.3 sends message 524 to central device 102. Similar to sub-connection event #1 532.1 and sub-connection event #2 532.2, peripheral devices 104.1 and 104.2 may receive messages 514, 518, 522, etc., but may ignore or discard those message because they are directed towards another peripheral device (e.g., peripheral device 104.3). Six messages are exchanged between central device 102 and peripheral device 104.3 during sub-connection event #3 532.3. Any number of messages may be transmitted in other examples during sub-connection event #3 532.3, and sub-connection event #3 532.3 may be any duration.

Figure 6:
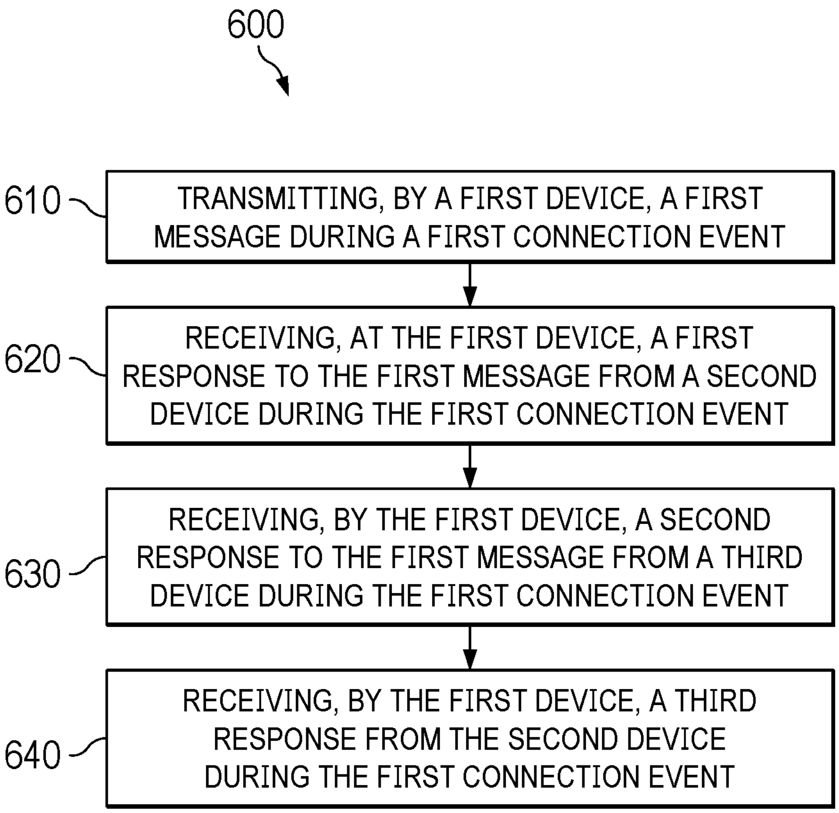
FIG. 6 is a flow diagram of a method for an MPC connection event in accordance with various examples.

FIG. 6 is a flow diagram of a method 600 for an MPC connection event in accordance with various examples herein. The steps of method 600 may be performed in any suitable order. The hardware components described above with respect to FIGS. 1 and 2 may be used to perform method 600 in some examples. Any suitable hardware, software, or digital logic may perform method 600 in some examples.

Method 600 begins at 610, where a first device transmits a first message during a first connection event. As one example, the central device 102 transmits a message during a main MPC connection event 202. The first message may be an advertisement packet in one example. The first message may be broadcast or multicast to multiple other devices. In some examples, a peripheral device 104 transmits the first message.

Method 600 continues at 620, where the first device receives a first response to the first message from a second device during the first connection event. The second device may be a first peripheral device 104 in one example.

Method 600 continues at 630, where the first device receives a second response to the first message from a third device during the first connection event. The third device may be a second peripheral device 104 in one example. In this example, multiple peripheral devices 104 may communicate with a central device 102 during a single connection event.

Method 600 continues at 640, where the first device receives a third response from the second device during the first connection event. In this example, a first device (such as a central device 102) receives a first response from a first peripheral device 104 (e.g., the second device), then receives a second response from a second peripheral device 104 (e.g., the third device), and then receives a third response from the first peripheral device 104 (e.g., the second device). Therefore, in examples herein, more complex connection events 202 are described, which contain two or more sub-connection events 204. A device may communicate with another device during multiple non-consecutive sub-connection events 204 during a connection event 202. Three or more devices may communicate with one another during a connection event 202.

As illustrated in FIG. 6 (and also in FIGS. 3-5), in some embodiments, the number of packets exchanged during different sub-connection events of a main MPC connection event may be different.

Figure 7:
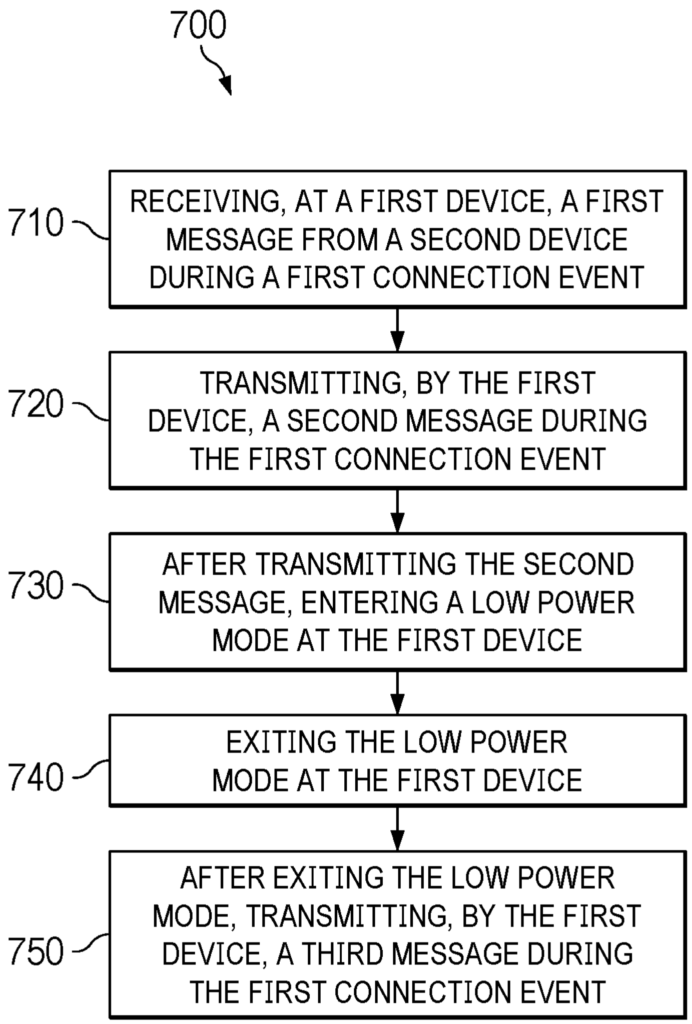
FIG. 7 is a flow diagram of a method for an MPC connection event in accordance with various examples.

FIG. 7 is a flow diagram of a method 700 for an MPC connection event in accordance with various examples herein. The steps of method 700 may be performed in any suitable order. The hardware components described above with respect to FIGS. 1 and 2 may be used to perform method 700 in some examples. Any suitable hardware, software, or digital logic may perform method 700 in some examples.

Method 700 begins at 710, where a first device receives a first message from a second device during a first connection event. The first device may be a peripheral device 104 in one example, and the second device may be a central device 102. The first message may be an advertisement packet or may be any other type of message.

Method 700 continues at 720, where the first device transmits a second message during the first connection event. The second message may be a response to the first message. The second message may be transmitted by a peripheral device 104 in one example.

Method 700 continues at 730, where after transmitting the second message, the first device enters a low power mode. The low power mode may be a sleep mode in one example. As described above with respect to FIG. 4, peripheral device 104.1 may enter a sleep mode or a low power mode after sub-connection event #1 440.1 concludes.

Method 700 continues at 740, where the first device exits the low power mode. In one example, the first device exits the low power mode to prepare to receive one or more messages in another sub-connection event 204 of the main connection event 202.

Method 700 continues at 750 where, after exiting the low power mode, the first device transmits a third message during the first connection event. As shown in this example, a first device may communicate with another device during a first sub-connection event 204, enter a sleep mode for one or more sub-connection events 204, and then wake up for a second sub-connection event 204 and communicate again, all during a single main connection event 202. In these examples, more than two devices can communicate during a single main connection event 202, and the devices may communicate during non-consecutive sub-connection events 204 of the main connection event 202. The devices may also save power by entering or exiting low power modes at the appropriate times during a main connection event 202.

In some embodiments, such as illustrated in FIG. 7, a peripheral device 104 may request particular data from central device 102 during a first connection event 204. Production of such data may take more time than the time in which central device 102 is to respond to such request during the same sub-connection event, but may take less time than the total duration of the main MPC event 202. In some such embodiments, the peripheral device 104 may enter low power mode while device 102 produces such data. Device 104 may later wake up in a later sub-connection event of the same main MPC event 202 and receive such data. Thus, in some such embodiments, latency is advantageously reduced as opposed to conventional systems (in which the device 104 requesting the data would have had to wait until a next connection event to receive such data).

Figure 8:
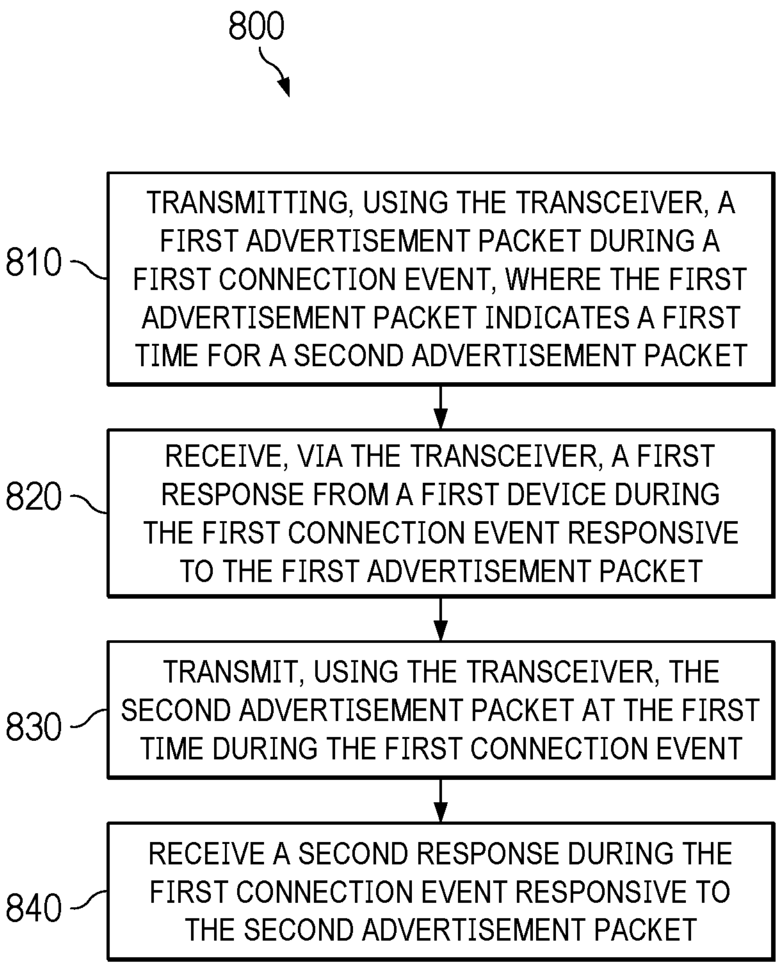
FIG. 8 is a flow diagram of a method for an MPC connection event in accordance with various examples.

FIG. 8 is a flow diagram of a method 800 for an MPC connection event in accordance with various examples herein. The steps of method 800 may be performed in any suitable order. The hardware components described above with respect to FIGS. 1 and 2 may be used to perform method 800 in some examples. Any suitable hardware, software, or digital logic may perform method 800 in some examples.

Method 800 begins at 810, where an electronic device transmits a first advertisement packet during a first connection event, where the first advertisement packet indicates a first time for a second advertisement packet. In one example, the electronic device is a central device 102. The first advertisement packet may be broadcast or multicast to multiple peripheral devices 104 in one example. The first advertisement packet may include any information regarding a service pattern or a feature set, such as specific supported features, and may also indicate the time that a second advertisement packet will be transmitted.

Method 800 continues at 820, where the electronic device receives a first response from a first device during the first connection event responsive to the first advertisement packet. The first device may be a peripheral device 104 in one example. The first response may be an acceptance of a service pattern from the first advertisement packet, or may be a negotiation for the service pattern. The first response may be received during a first sub-connection event 204 of the first connection event 202 in one example.

Method 800 continues at 830, where the electronic device transmits the second advertisement packet at the first time during the first connection event. The first time may be during a second sub-connection event 204 of the first connection event 202 in one example.

Method continues at 840, where the electronic device receives a second response during the first connection event responsive to the second advertisement packet. The second response may come from the first device or from another device. In one example, the second advertisement packet indicates a second time for a third advertisement packet. In another example, the second time is based on data exchanged after transmission of the first advertisement packet.

Figure 9:
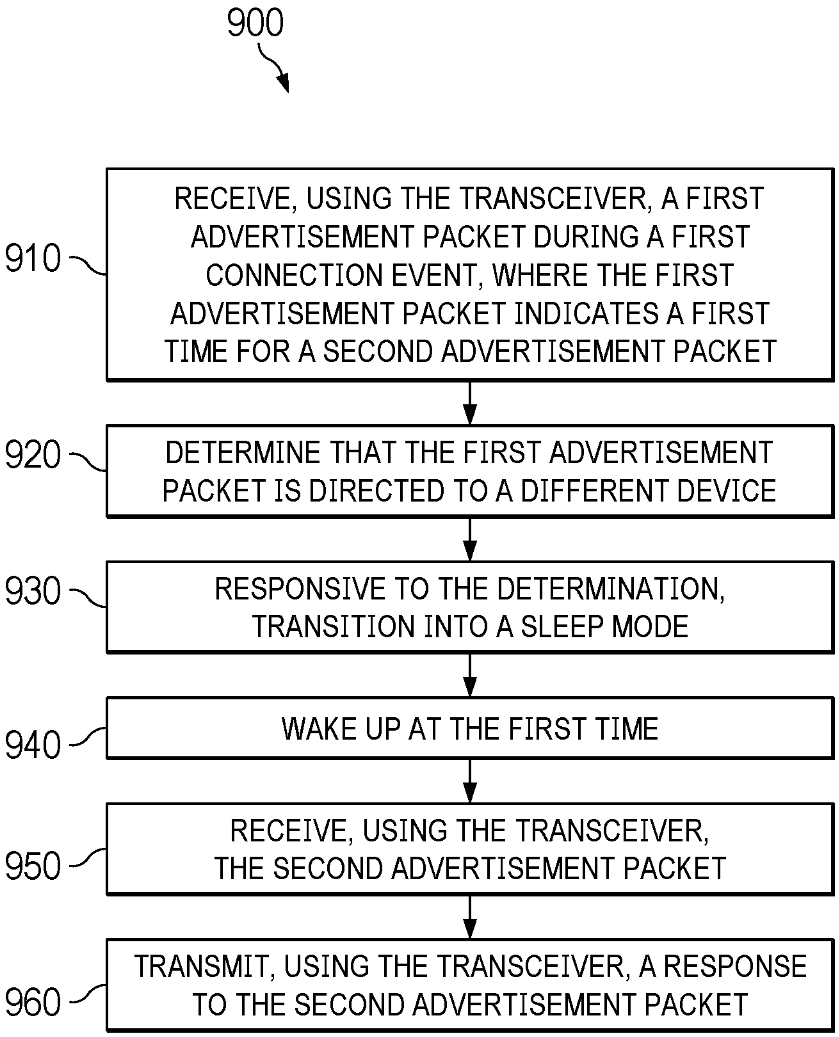
FIG. 9 is a flow diagram of a method for an MPC connection event in accordance with various examples.

FIG. 9 is a flow diagram of a method 900 for an MPC connection event in accordance with various examples herein. The steps of method 900 may be performed in any suitable order. The hardware components described above with respect to FIGS. 1 and 2 may be used to perform method 900 in some examples. Any suitable hardware, software, or digital logic may perform method 900 in some examples.

Method 900 begins at 910, where an electronic device receives a first advertisement packet during a first connection event, where the first advertisement packet indicates a first time for a second advertisement packet. The electronic device may be a peripheral device 104 in one example.

Method 900 continues at 920, where the electronic device determines that the first advertisement packet is directed to a different device. As described herein, the electronic device may determine that the advertisement packet is directed to a different device by reading a device identifier in the advertisement packet. The electronic device may also determine that the advertisement packet is directed to a different device if the electronic device cannot decrypt the advertisement packet.

Method 900 continues at 930, where responsive to the determination, the electronic device transitions into a sleep mode. The electronic device may transition into a sleep mode to save power until a later time when the electronic device will resume communicating with other devices in the system (e.g., such as wake up at a time for receiving the next advertisement packet).

Method 900 continues at 940, where the electronic device wakes up at the first time. The first time may be the beginning of a specific sub-connection event 204 in one example.

Method 900 continues at 950, where the electronic device receives the second advertisement packet. The second advertisement packet may be sent by a central device 102 in one example, or a different device in another example.

Method 900 continues at 960, where the electronic device transmits a response to the second advertisement packet. As described herein, the response may be transmitted during a current sub-connection event 204 or a subsequent sub-connection event 204 of a main connection event 202. The response may include a negotiation of a feature set or service pattern in some examples.

In one example, the second advertisement packet indicates a second time for a third advertisement packet. In another example, the second advertisement packet includes a feature set or service pattern for the first connection event.

Figure 10:
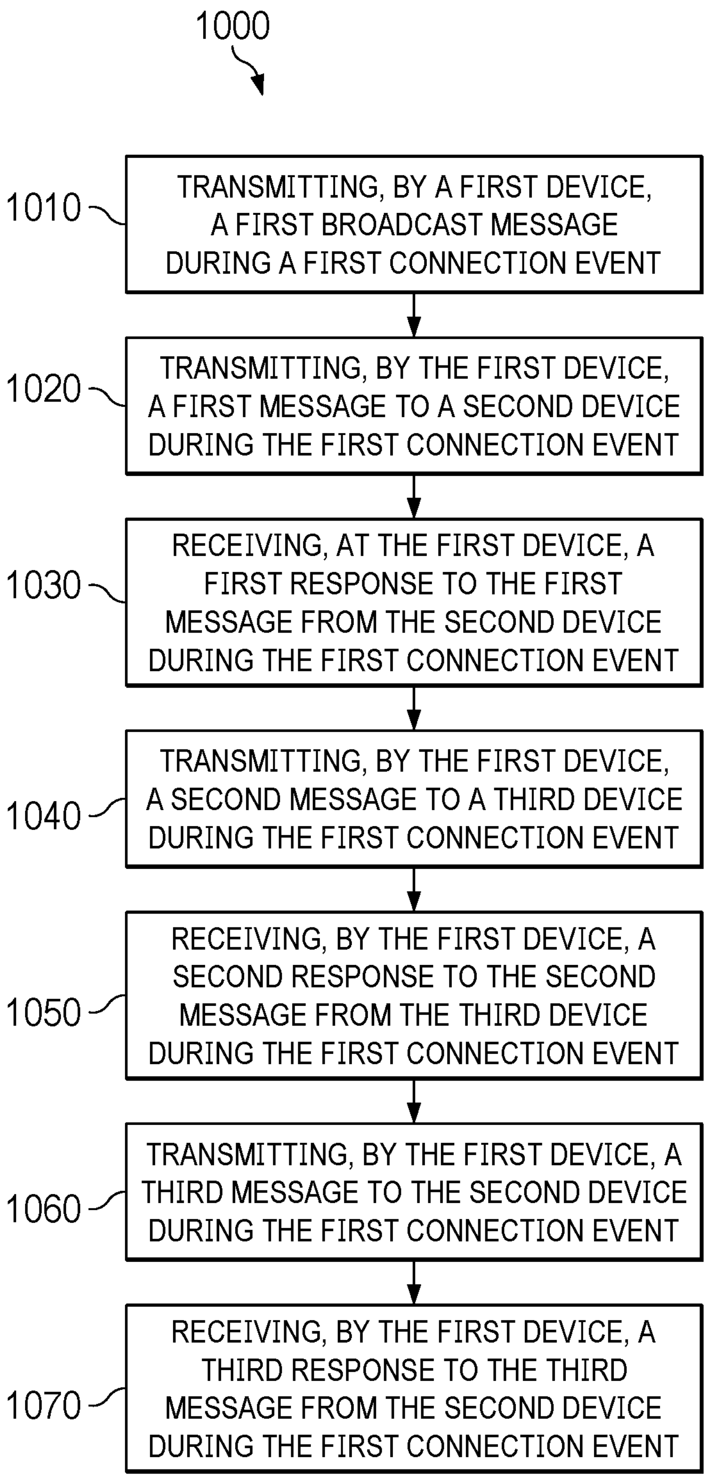
FIG. 10 is a flow diagram of a method for an MPC connection event in accordance with various examples.

FIG. 10 is a flow diagram of a method 1000 for an MPC connection event in accordance with various examples herein. The steps of method 1000 may be performed in any suitable order. The hardware components described above with respect to FIGS. 1 and 2 may be used to perform method 1000 in some examples. Any suitable hardware, software, or digital logic may perform method 1000 in some examples.

Method 1000 begins at 1010, where a first device transmits a first broadcast message during a first connection event. As one example, the central device 102 transmits a message during a main MPC connection event 202. The first message may be an advertisement packet in one example. In some examples, a peripheral device 104 transmits the first message. The first broadcast message may provide an indication that the associated sub-connection event is allocated to a second device.

Method 1000 continues at 1020, where the first device transmits a first message to the second device during the first connection event. The first message may be a message directed to the second device. The first message may be transmitted during a first sub-connection event in one example. The second device may be a peripheral device 104 in one example.

Method 1000 continues at 1030, where the first device receives a first response to the first message from the second device during the first connection event. The first device may receive the first response during the first sub-connection event in one example.

Method 1000 continues at 1040, where the first device transmits a second message to a third device during the first connection event. The third device may be a peripheral device 104 in one example. The first device may transmit the second message during a second sub-connection event in one example.

Method 1000 continues at 1050, where the first device receives a second response to the second message from the third device during the first connection event. The second response may be received by the first device during the second sub-connection event in one example.

Method 1000 continues at 1060, where the first device transmits a third message to the second device during the first connection event. The third message may be transmitted during the first sub-connection event, a third sub-connection event, or during another sub-connection event.

Method 1000 continues at 1070, where the first device receives a third response to the third message from the second device during the first connection event. The third response may be received during the third sub-connection event in one example.

Figure 11:
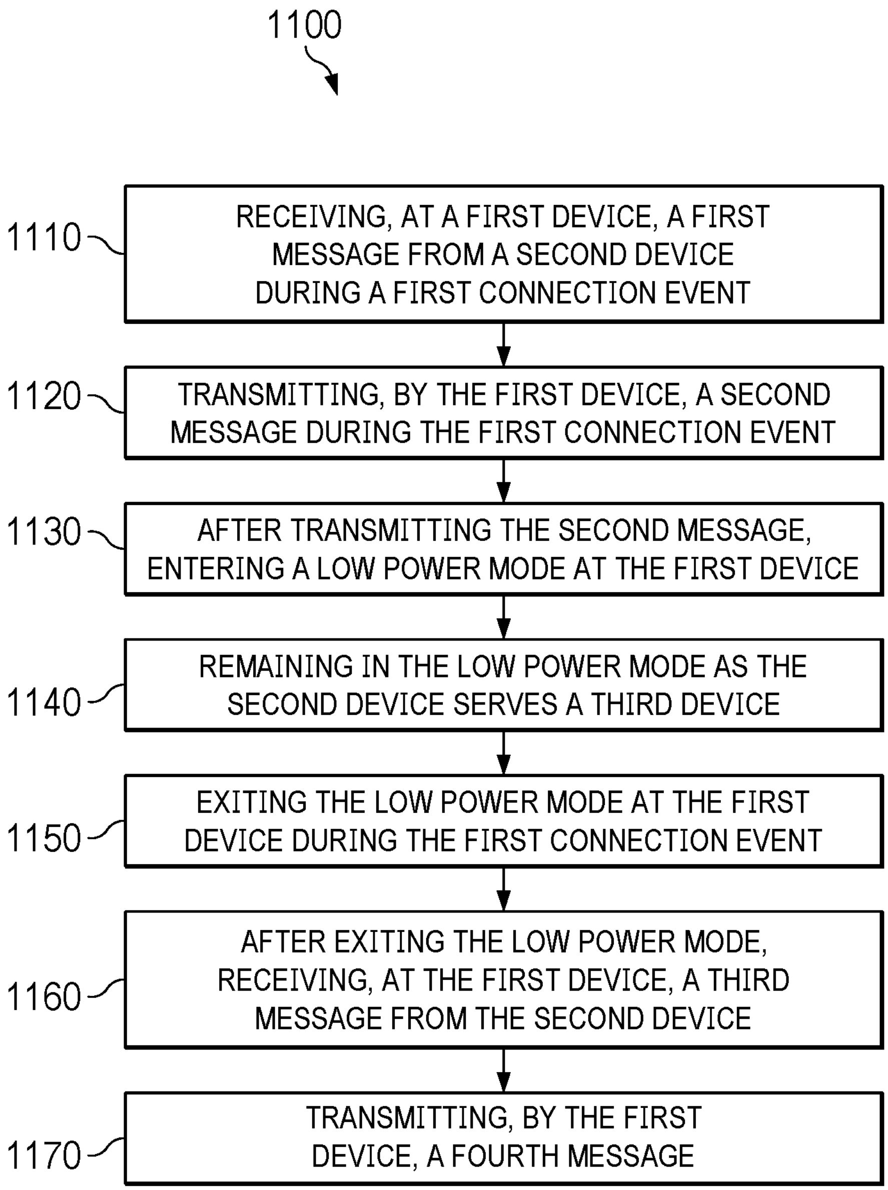
FIG. 11 is a flow diagram of a method for an MPC connection event in accordance with various examples.

FIG. 11 is a flow diagram of a method 1100 for an MPC connection event in accordance with various examples herein. The steps of method 1100 may be performed in any suitable order. The hardware components described above with respect to FIGS. 1 and 2 may be used to perform method 1100 in some examples. Any suitable hardware, software, or digital logic may perform method 1100 in some examples.

Method 1100 begins at 1110, where a first device receives a first message from a second device during a first connection event. The first device may be a peripheral device 104 in one example. The second device may be a central device 102 in one example. The first message may be received during a first sub-connection event of the first connection event.

Method 1100 continues at 1120, where the first device transmits a second message during the first connection event. The second message may be transmitted to the first device in one example, such as to a central device 102.

Method 1100 continues at 1130, where after transmitting the second message, the first device enters a low power mode. The low power mode may be a sleep mode in one example. The first device may remain in the low power mode for any period of time.

Method 1100 continues at 1140, where the first device remains in the low power mode as the second device serves a third device. The third device may be another peripheral device 104 that is served by a central device 102. The second device may serve the third device during the first connection event. The second device may serve the third device during a second sub-connection event of the first connection event in an example.

Method 1100 continues at 1150, where the first device exits the low power mode during the first connection event. The first device may exit the low power mode after a predefined duration of time has passed. The first device may exit the low power mode during any sub-connection event of the first connection event.

Method 1100 continues at 1160, where after exiting the low power mode, the first device receives a third message from the second device. The second device may send the third message at a predetermined time after the first device exits the low power mode in one example.

Method 1100 continues at 1170, where the first device transmits a fourth message. The first device may transmit the fourth message to the second device in one example. The fourth message may be a response to the third message in one example. The fourth message may be transmitted during any sub-connection event of the first connection event.

In examples herein, connection events between a central device and multiple peripheral devices are described. In some embodiments, with a multi-peripheral connection, a central device may serve more than one peripheral at a single BLE connection event. Serving more than one peripheral within a single connection event may provide more efficient transmissions by reducing overhead compared to other systems. In examples herein, a device (central or peripheral) may advertise a feature set and its capabilities. Recipients of the advertisement may send a request to join and/or negotiate service patterns and feature sets. Therefore, different peripherals may utilize different feature sets during a single connection event.

In examples herein, peripheral devices may modify the service dynamically by renegotiating a feature set with a central device. Transmissions between devices may be secured with encryption using the examples herein. The examples described herein also enable power savings by allowing peripheral devices to enter a sleep mode or a low power mode during portions of the main connection event. The processes described herein may have lower delays compared to other advertising schemes, due to multiple peripheral devices being served by a central device during a single connection event.

Example embodiments of the present disclosure are summarized here. Other embodiments can also be understood from the entirety of the specification and the claims filed herein.

Example 1. A method, including: transmitting, by a first device, a first message during a first connection event; receiving, at the first device, a first response to the first message from a second device during the first connection event; receiving, by the first device, a second response to the first message from a third device during the first connection event; and receiving, by the first device, a third response from the second device during the first connection event.

Example 2. The method of example 1, where the first device receives the third response after the first response and before the second response.

Example 3. The method of one of examples 1 or 2, where the first device receives the third response after the first response and after the second response.

Example 4. The method of one of examples 1 to 3, where the first message is a broadcast message.

Example 5. The method of one of examples 1 to 4, where the first message is a multicast message directed to the second and third devices.

Example 6. The method of one of examples 1 to 5, further including: transmitting, by the first device, a second message to the second device during the first connection event; and transmitting a third message to the third device during the first connection event, where the second message is encrypted with a first encryption key associated with the second device, and where the third message is encrypted with a second encryption key associated with the third device.

Example 7. The method of one of examples 1 to 6, where all packet exchanges between the first device and another device during the first connection event occur on a same channel.

Example 8. The method of one of examples 1 to 7, where the first connection event has a first multi-peripheral connection service pattern, the method further including transmitting, by the first device, a second message during a second connection event after the first connection event, where the second connection event has a second multi-peripheral connection service pattern different from the first multi-peripheral connection service pattern.

Example 9. The method of one of examples 1 to 8, further including: transmitting the first message from the first device to a fourth device during the first connection event; and receiving a fourth response at the first device from the fourth device during the first connection event.

Example 10. The method of one of examples 1 to 9, where the first message includes a first duration for a first sub-connection event during the first connection event for the second device, and a second duration for a second sub-connection event during the first connection event for the third device.

Example 11. The method of one of examples 1 to 10, where a number of packets exchanged between the first device and the second device during the first sub-connection event is larger than one.

Example 12. The method of one of examples 1 to 11, where the number of packets exchanged between the first device and the second device during the first sub-connection event is larger than two.

Example 13. The method of one of examples 1 to 12, where a number of packets exchanged during the first sub-connection event is different from a number of packets exchanged during the second sub-connection event.

Example 14. The method of one of examples 1 to 13, where the first duration and the second duration are different durations.

Example 15. The method of one of examples 1 to 14, where the first device receives the first response during the first sub-connection event, and receives the second response during the second sub-connection event.

Example 16. The method of one of examples 1 to 15, where the first device receives the third response during the second sub-connection event.

Example 17. The method of one of examples 1 to 16, where the first message includes a third length for a third sub-connection event during the first connection event for the second device, and where the first device receives the third response during the third sub-connection event.

Example 18. The method of one of examples 1 to 17, where the first and third sub-connection events are not consecutive sub-connection events.

Example 19. The method of one of examples 1 to 18, where the first sub-connection event is an initial sub-connection event during the first connection event, and the third sub-connection event is a last sub-connection event during the first connection event.

Example 20. The method of one of examples 1 to 19, further including transmitting, by the first device, a third message during the third sub-connection event, the third message being responsive to the first response.

Example 21. The method of one of examples 1 to 20, where the second device transitions into a sleep mode between transmission of the first response and transmission of the third response.

Example 22. The method of one of examples 1 to 21, where the first device is a central Bluetooth Low Energy (BLE) device.

Example 23. The method of one of examples 1 to 22, where the second device is a peripheral BLE device.

Example 24. The method of one of examples 1 to 23, where the first message is an advertisement packet that includes a feature set for the first connection event.

Example 25. The method of one of examples 1 to 24, where the feature set includes a duration of the first connection event, an anchor point, or a transmission rate.

Example 26. The method of one of examples 1 to 25, where the first response includes a request from the second device for a multi-peripheral service pattern.

Example 27. A method, including: receiving, at a first device, a first message from a second device during a first connection event; transmitting, by the first device, a second message during the first connection event; after transmitting the second message, entering a low power mode at the first device; exiting the low power mode at the first device; and after exiting the low power mode, transmitting, by the first device, a third message during the first connection event.

Example 28. The method of example 27, where the first message is a broadcast or multicast message.

Example 29. The method of one of examples 27 or 28, where the first message includes an advertisement packet that specifies a first sub-connection event for the first device, and a second sub-connection event for a third device.

Example 30. The method of one of examples 27 to 29, where the advertisement packet further specifies a third sub-connection event for the first device, where the first device transmits the second message during the first connection event, and transmits the third message during the third connection event.

Example 31. The method of one of examples 27 to 30, where the advertisement packet indicates a sub-connection event time, where the first device exits the low power mode based on the sub-connection event time.

Example 32. The method of one of examples 27 to 31, further including: receiving, at a third device, the first message from the second device during the first connection event; determining that the first message is directed to a different device; and discarding the first message.

Example 33. The method of one of examples 27 to 32, where determining that the first message is directed to a different device includes reading a device identifier in the first message.

Example 34. The method of one of examples 27 to 33, where the second message includes a request to renegotiate one or more features of the first connection event.

Example 35. The method of one of examples 27 to 34, where the second message includes one or more capabilities of the first device.

Example 36. The method of one of examples 27 to 35, where a third device receives the first message from the second device during the first connection event.

Example 37. An electronic device, including: a transceiver; and a processor configured to: transmit, using the transceiver, a first advertisement packet during a first connection event, where the first advertisement packet indicates a first time for a second advertisement packet; receive, via the transceiver, a first response from a first device during the first connection event responsive to the first advertisement packet; transmit, using the transceiver, the second advertisement packet at the first time during the first connection event; and receive a second response during the first connection event responsive to the second advertisement packet.

Example 38. The electronic device of example 37, where receiving the second response includes receiving the second response from the first device.

Example 39. The electronic device of one of examples 37 or 38, where receiving the second response includes receiving the second response from a second device.

Example 40. The electronic device of one of examples 37 to 39, where the second advertisement packet indicates a second time for a third advertisement packet, where the processor is configured to transmit, using the transceiver, the third advertisement packet at the second time during the first connection event.

Example 41. The electronic device of one of examples 37 to 40, where the second time is based on data exchanged after transmission of the first advertisement packet.

Example 42. The electronic device of one of examples 37 to 41, where a first time period between transmission of the first advertisement packet and the second advertisement packet is different from a second time period between transmission of the second advertisement packet and the third advertisement packet.

Example 43. The electronic device of one of examples 37 to 42, where the first advertisement packet includes a feature set for the first connection event.

Example 44. The electronic device of one of examples 37 to 43, where the first response includes a request to renegotiate a feature of the first connection event.

Example 45. The electronic device of one of examples 37 to 44, where the processor is further configured to: receive the first response during a first sub-connection event of the first connection event; and receive the second response during a second sub-connection event of the first connection event.

Example 46. An electronic device, including: a transceiver; and a processor configured to: receive, using the transceiver, a first advertisement packet during a first connection event, where the first advertisement packet indicates a first time for a second advertisement packet; determine that the first advertisement packet is directed to a different device; responsive to the determination, transition into a sleep mode; wake up at the first time; receive, using the transceiver, the second advertisement packet; and transmit, using the transceiver, a response to the second advertisement packet.

Example 47. The electronic device of example 46, where the second advertisement packet indicates a second time for a third advertisement packet.

Example 48. The electronic device of one of examples 46 or 47, where the second advertisement packet includes a feature set for the first connection event.

Example 49. The electronic device of one of examples 46 to 48, where the response includes a request to renegotiate a feature of the first connection event.

Example 50. The electronic device of one of examples 46 to 49, where the processor is further configured to: receive the first advertisement packet during a first sub-connection event of the first connection event; and receive the second advertisement packet during a second sub-connection event of the first connection event.

Example 51. A method, including: transmitting, by a first device, a first broadcast message during a first connection event; transmitting, by the first device, a first message to a second device during the first connection event; receiving, at the first device, a first response to the first message from the second device during the first connection event; transmitting, by the first device, a second message to a third device during the first connection event; receiving, by the first device, a second response to the second message from the third device during the first connection event; transmitting, by the first device, a third message to the second device during the first connection event; and receiving, by the first device, a third response to the third message from the second device during the first connection event.

Example 52. The method of example 51, where the first message is an advertising message.

Example 53. The method of one of examples 51 or 52, further including: transmitting, by the first device, a fourth message to the second device during the first connection event; and transmitting a fifth message to the third device during the first connection event, where the fourth message is encrypted with a first encryption key associated with the second device, and where the fifth message is encrypted with a second encryption key associated with the third device.

Example 54. The method of one of examples 51 to 53, where the first connection event has a first multi-peripheral connection service pattern, the method further including transmitting, by the first device, a fourth message during a second connection event after the first connection event, where the second connection event has a second multi-peripheral connection service pattern different from the first multi-peripheral connection service pattern.

Example 55. The method of one of examples 51 to 54, further including: transmitting a fourth message from the first device to a fourth device during the first connection event; and receiving a fourth response at the first device from the fourth device during the first connection event.

Example 56. The method of one of examples 51 to 55, where the first broadcast message includes a first duration for a first sub-connection event during the first connection event for the second device, and a second duration for a second sub-connection event during the first connection event for the third device.

Example 57. The method of one of examples 51 to 56, where the first device receives the first response during the first sub-connection event, and receives the second response during the second sub-connection event.

Example 58. The method of one of examples 51 to 57, where the first message includes a third duration for a third sub-connection event during the first connection event for the second device, and where the first device receives the third response during the third sub-connection event.

Example 59. The method of one of examples 51 to 58, further including transmitting, by the first device, a fourth message during the third sub-connection event, the fourth message being responsive to the first response.

Example 60. A method, including: receiving, at a first device, a first message from a second device during a first connection event; transmitting, by the first device, a second message during the first connection event; after transmitting the second message, entering a low power mode at the first device; remaining in the low power mode as the second device serves a third device; exiting the low power mode at the first device during the first connection event; after exiting the low power mode, receiving, at the first device, a third message from the second device; and transmitting, by the first device, a fourth message.

Example 61. The method of example 60, where the first message is a broadcast or multicast message during the first connection event.

Example 62. The method of one of examples 60 or 61, where the first message includes an advertisement packet that specifies a first sub-connection event for the first device, and a second sub-connection event for the third device.

Example 63. The method of one of examples 60 to 62, where the advertisement packet further specifies a third sub-connection event for the first device, where the first device transmits the second message during the first sub-connection event, and transmits the fourth message during the third sub-connection event.

Example 64. The method of one of examples 60 to 63, further including: receiving, at the third device, the first message from the second device during the first connection event; determining that the first message is directed to a different device; and discarding the first message.

Example 65. The method of one of examples 60 to 64, where the first device remains in the low power mode until a second connection event.

Example 66. An electronic device, including: a transceiver; and a processor configured to: transmit, using the transceiver, a first advertisement packet during a first connection event, where the first advertisement packet indicates a first time for a second advertisement packet; receive, via the transceiver, a first response from a first device during a first sub-connection event of the first connection event responsive to the first advertisement packet; transmit, using the transceiver, the second advertisement packet at the first time during a second sub-connection event of the first connection event; and receive a second response during the first connection event responsive to the second advertisement packet.

Example 67. The electronic device of example 66, where the second advertisement packet indicates a second time for a third advertisement packet, where the processor is configured to transmit, using the transceiver, the third advertisement packet at the second time during the first connection event.

Example 68. The electronic device of one of examples 66 or 67, where a first time period between transmission of the first advertisement packet and the second advertisement packet is different from a second time period between transmission of the second advertisement packet and the third advertisement packet.

Example 69. The electronic device of one of examples 66 to 68, where the third advertisement packet is transmitted during a third sub-connection event of the first connection event.

While this disclosure has been described with reference to illustrative embodiments, this description is not limiting. Various modifications and combinations of the illustrative embodiments, as well as other embodiments, will be apparent to persons skilled in the art upon reference to the description.

What is claimed is:

1. A method, comprising:

broadcasting, by a first device, a first message during a first connection event to a second device and a third device, wherein the first message comprises an advertisement packet, and wherein the advertisement packet indicates a first start time allocated to the second device, a second start time allocated to the third device, and a third start time allocated to the second device;

receiving, at the first device, a first response to the first message from the second device during the first connection event and after the first start time allocated to the second device;

receiving, by the first device, a second response to the first message from the third device during the first connection event and after the second start time allocated to the third device; and receiving, by the first device, a third response from the second device during the first connection event and after the third start time allocated to the second device.

2. The method of claim 1, wherein the advertisement packet further indicates a fourth start time allocated to the second device, and wherein the first device receives the third response after the first response and before the second response, during the first connection event and after the fourth start time allocated to the second device.

3. The method of claim 1, wherein the advertisement packet further indicates a fourth start time allocated to the second device, and wherein the first device receives the third response after the first response and after the second response, during the first connection event and after the fourth start time allocated to the second device.

4. The method of claim 1, wherein the first message is a multicast message directed to the second and third devices.

5. The method of claim 1, further comprising:

transmitting, by the first device, a second message to the second device during the first connection event; and transmitting a third message to the third device during the first connection event, wherein the second message is encrypted with a first encryption key associated with the second device, and wherein the third message is encrypted with a second encryption key associated with the third device.

6. The method of claim 1, wherein all packet exchanges between the first device and another device during the first connection event occur on a same channel.

7. The method of claim 1, wherein the first connection event has a first multi-peripheral connection service pattern, the method further comprising transmitting, by the first device, a second message during a second connection event after the first connection event, wherein the second connection event has a second multi-peripheral connection service pattern different from the first multi-peripheral connection service pattern.

8. The method of claim 1, further comprising:

transmitting the first message from the first device to a fourth device during the first connection event; and receiving a fourth response at the first device from the fourth device during the first connection event.

9. The method of claim 1, wherein the first message includes a first duration for a first sub-connection event during the first connection event for the second device, and a second duration for a second sub-connection event during the first connection event for the third device.

10. The method of claim 9, wherein a number of packets exchanged between the first device and the second device during the first sub-connection event is larger than one.

11. The method of claim 10, wherein the number of packets exchanged between the first device and the second device during the first sub-connection event is larger than two.

12. The method of claim 9, wherein a number of packets exchanged during the first sub-connection event is different from a number of packets exchanged during the second sub-connection event.

13. The method of claim 9, wherein the first duration and the second duration are different durations.

14. The method of claim 9, wherein the first device receives the first response during the first sub-connection event, and receives the second response during the second sub-connection event.

15. The method of claim 14, wherein the first device receives the third response during the second sub-connection event.

16. The method of claim 14, wherein the first message includes a third duration for a third sub-connection event during the first connection event for the second device, and wherein the first device receives the third response during the third sub-connection event.

17. The method of claim 16, wherein the first and third sub-connection events are not consecutive sub-connection events.

18. The method of claim 16, wherein the first sub-connection event is an initial sub-connection event during the first connection event, and the third sub-connection event is a last sub-connection event during the first connection event.

19. The method of claim 16, further comprising transmitting, by the first device, a third message during the third sub-connection event, the third message being responsive to the first response.

20. The method of claim 1, wherein the second device transitions into a sleep mode between transmission of the first response and transmission of the third response.

21. The method of claim 1, wherein the first device is a central Bluetooth Low Energy (BLE) device.

22. The method of claim 1, wherein the second device is a peripheral BLE device.

23. The method of claim 1, wherein the first message is an advertisement packet that includes a feature set for the first connection event.

24. The method of claim 23, wherein the feature set includes a duration of the first connection event, an anchor point, or a transmission rate.

25. The method of claim 1, wherein the first response includes a request from the second device for a multi-peripheral service pattern.

* * * * *